US012544084B2

(12) United States Patent
Urbanski et al.

(10) Patent No.: US 12,544,084 B2
(45) Date of Patent: Feb. 10, 2026

(54) GUIDEWIRE FOR REDUCING HOOP STRESS

(71) Applicant: Boston Scientific Medical Device Limited, Ballybrit (IE)

(72) Inventors: John Paul Urbanski, Toronto (CA); Christian Balkovec, Burlington (CA)

(73) Assignee: Boston Scientific Medical Device Limited, Galway (IE)

( * ) Notice: Subject to any disclaimer, the term of this patent is extended or adjusted under 35 U.S.C. 154(b) by 848 days.

(21) Appl. No.: 17/792,751

(22) PCT Filed: Jan. 27, 2021

(86) PCT No.: PCT/IB2021/050629
§ 371 (c)(1),
(2) Date: Jul. 14, 2022

(87) PCT Pub. No.: WO2021/152478
PCT Pub. Date: Aug. 5, 2021

(65) Prior Publication Data
US 2023/0041021 A1 Feb. 9, 2023

Related U.S. Application Data

(60) Provisional application No. 62/967,205, filed on Jan. 29, 2020.

(51) Int. Cl.
*A61B 17/22* (2006.01)
*A61B 17/00* (2006.01)

(52) U.S. Cl.
CPC .... *A61B 17/22* (2013.01); *A61B 2017/00867* (2013.01); *A61B 2017/22038* (2013.01)

(58) Field of Classification Search
CPC . A61B 17/22; A61B 17/3403; A61B 17/3462; A61B 2017/00867;
(Continued)

(56) References Cited

U.S. PATENT DOCUMENTS

| 175,254 A | 3/1876 | Oberly |
| 827,626 A | 7/1906 | Gillet |

(Continued)

FOREIGN PATENT DOCUMENTS

| EP | 2673038 B1 | 7/2017 |
| JP | 2008-512212 A | 4/2008 |
| WO | 2019/009254 A1 | 1/2019 |

OTHER PUBLICATIONS

International Search Report and Written Opinion received for PCT Patent Application No. PCT/IB2021/050629, mailed on Apr. 23, 2021, 13 pages.

(Continued)

Primary Examiner — Beverly M Flanagan
(74) Attorney, Agent, or Firm — Nelson Mullins Riley & Scarborough LLP

(57) ABSTRACT

A medical guidewire assembly is movable through an exit portal of a guidewire introducer. The guidewire introducer and the medical guidewire assembly are each insertable, at least in part, into a patient. The medical guidewire assembly is configured to reduce, at least in part, the hoop stress surrounding a puncture hole extending through the tissue of the patient. This is done in response to movement, at least in part, of the medical guidewire assembly relative to the puncture hole (after the puncture hole has been initially formed).

19 Claims, 6 Drawing Sheets

(58) Field of Classification Search
CPC .......... A61B 2017/22038; A61B 2017/00247; A61B 2017/3425
USPC .......................................................... 606/45
See application file for complete search history.

(56) References Cited

U.S. PATENT DOCUMENTS

| | | |
|---|---|---|
| 848,711 A | 4/1907 | Weaver |
| 1,072,954 A | 9/1913 | Junn |
| 1,279,654 A | 9/1918 | Charlesworth |
| 1,918,094 A | 7/1933 | Geekas |
| 1,996,986 A | 4/1935 | Weinberg |
| 2,021,989 A | 11/1935 | De Master |
| 2,146,636 A | 2/1939 | Lipchow |
| 3,429,574 A | 2/1969 | Williams |
| 3,448,739 A | 6/1969 | Stark et al. |
| 3,575,415 A | 4/1971 | Fulp et al. |
| 3,595,239 A | 7/1971 | Petersen |
| 4,129,129 A | 12/1978 | Amrine |
| 4,244,362 A | 1/1981 | Anderson |
| 4,401,124 A | 8/1983 | Guess et al. |
| 4,639,252 A | 1/1987 | Kelly et al. |
| 4,641,649 A | 2/1987 | Walinsky et al. |
| 4,669,467 A | 6/1987 | Willett et al. |
| 4,682,596 A | 7/1987 | Bales et al. |
| 4,790,311 A | 12/1988 | Ruiz |
| 4,790,809 A | 12/1988 | Kuntz |
| 4,793,350 A | 12/1988 | Mar et al. |
| 4,807,620 A | 2/1989 | Strul et al. |
| 4,832,048 A | 5/1989 | Cohen |
| 4,840,622 A | 6/1989 | Hardy |
| 4,863,441 A | 9/1989 | Lindsay et al. |
| 4,884,567 A | 12/1989 | Elliott et al. |
| 4,892,104 A | 1/1990 | Ito et al. |
| 4,896,671 A | 1/1990 | Cunningham et al. |
| 4,928,693 A | 5/1990 | Goodin et al. |
| 4,936,281 A | 6/1990 | Stasz |
| 4,960,410 A | 10/1990 | Pinchuk |
| 4,977,897 A | 12/1990 | Hurwitz |
| 4,998,933 A | 3/1991 | Eggers et al. |
| 5,006,119 A | 4/1991 | Acker et al. |
| 5,019,076 A | 5/1991 | Yamanashi et al. |
| 5,047,026 A | 9/1991 | Rydell |
| 5,081,997 A | 1/1992 | Bosley et al. |
| 5,098,431 A | 3/1992 | Rydell |
| 5,112,048 A | 5/1992 | Kienle |
| 5,154,724 A | 10/1992 | Andrews |
| 5,201,756 A | 4/1993 | Horzewski et al. |
| 5,209,741 A | 5/1993 | Spaeth |
| 5,211,183 A | 5/1993 | Wilson |
| 5,221,256 A | 6/1993 | Mahurkar |
| 5,230,349 A | 7/1993 | Langberg |
| 5,281,216 A | 1/1994 | Klicek |
| 5,300,068 A | 4/1994 | Rosar et al. |
| 5,300,069 A | 4/1994 | Hunsberger et al. |
| 5,314,418 A | 5/1994 | Takano et al. |
| 5,318,525 A | 6/1994 | West et al. |
| 5,327,905 A | 7/1994 | Avitall |
| 5,364,393 A | 11/1994 | Auth et al. |
| 5,372,596 A | 12/1994 | Klicek et al. |
| 5,380,304 A | 1/1995 | Parker |
| 5,397,304 A | 3/1995 | Truckai |
| 5,403,338 A | 4/1995 | Milo |
| 5,423,809 A | 6/1995 | Klicek |
| 5,425,382 A | 6/1995 | Golden et al. |
| 5,490,859 A | 2/1996 | Mische et al. |
| 5,497,774 A | 3/1996 | Swartz et al. |
| 5,507,751 A | 4/1996 | Goode et al. |
| 5,509,411 A | 4/1996 | Littmann et al. |
| 5,540,681 A | 7/1996 | Strul et al. |
| 5,545,200 A | 8/1996 | West et al. |
| 5,555,618 A | 9/1996 | Winkler |
| 5,571,088 A | 11/1996 | Lennox et al. |
| 5,575,766 A | 11/1996 | Swartz et al. |
| 5,575,772 A | 11/1996 | Lennox |
| 5,599,347 A | 2/1997 | Hart et al. |
| 5,605,162 A | 2/1997 | Mirzaee et al. |
| 5,617,878 A | 4/1997 | Taheri |
| 5,622,169 A | 4/1997 | Golden et al. |
| 5,624,430 A | 4/1997 | Eton et al. |
| 5,667,488 A | 9/1997 | Lundquist et al. |
| 5,673,695 A | 10/1997 | Mcgee et al. |
| 5,674,208 A | 10/1997 | Berg et al. |
| 5,683,366 A | 11/1997 | Eggers et al. |
| 5,720,744 A | 2/1998 | Eggleston et al. |
| 5,741,249 A | 4/1998 | Moss et al. |
| 5,766,135 A | 6/1998 | Terwilliger |
| 5,779,688 A | 7/1998 | Imran et al. |
| 5,810,764 A | 9/1998 | Eggers et al. |
| 5,814,028 A | 9/1998 | Swartz et al. |
| 5,830,214 A | 11/1998 | Flom et al. |
| 5,836,875 A | 11/1998 | Webster, Jr. |
| 5,849,011 A | 12/1998 | Jones et al. |
| 5,851,210 A | 12/1998 | Torossian |
| 5,885,227 A | 3/1999 | Finlayson |
| 5,888,201 A | 3/1999 | Stinson et al. |
| 5,893,848 A | 4/1999 | Negus et al. |
| 5,893,885 A | 4/1999 | Webster, Jr. |
| 5,904,679 A | 5/1999 | Clayman |
| 5,916,210 A | 6/1999 | Winston |
| 5,921,957 A | 7/1999 | Killion et al. |
| 5,931,818 A | 8/1999 | Werp et al. |
| 5,944,023 A | 8/1999 | Johnson et al. |
| 5,951,482 A | 9/1999 | Winston et al. |
| 5,957,842 A | 9/1999 | Littmann et al. |
| 5,964,757 A | 10/1999 | Ponzi |
| 5,967,976 A | 10/1999 | Larsen et al. |
| 5,989,276 A | 11/1999 | Houser et al. |
| 6,007,555 A | 12/1999 | Devine |
| 6,009,877 A | 1/2000 | Edwards |
| 6,013,072 A | 1/2000 | Winston et al. |
| 6,017,340 A | 1/2000 | Cassidy et al. |
| 6,018,676 A | 1/2000 | Davis et al. |
| 6,030,380 A | 2/2000 | Auth et al. |
| 6,032,674 A | 3/2000 | Eggers et al. |
| 6,048,349 A | 4/2000 | Winston et al. |
| 6,053,870 A | 4/2000 | Fulton, III |
| 6,053,904 A | 4/2000 | Scribner et al. |
| 6,056,747 A | 5/2000 | Saadat et al. |
| 6,063,093 A | 5/2000 | Winston et al. |
| 6,093,185 A | 7/2000 | Ellis et al. |
| 6,106,515 A | 8/2000 | Winston et al. |
| 6,106,520 A | 8/2000 | Laufer et al. |
| 6,117,131 A | 9/2000 | Taylor |
| 6,142,992 A | 11/2000 | Cheng et al. |
| 6,146,380 A | 11/2000 | Racz et al. |
| 6,155,264 A | 12/2000 | Ressemann et al. |
| 6,156,031 A | 12/2000 | Aita et al. |
| 6,171,305 B1 | 1/2001 | Sherman |
| 6,179,824 B1 | 1/2001 | Eggers et al. |
| 6,193,676 B1 | 2/2001 | Winston et al. |
| 6,193,715 B1 | 2/2001 | Wrublewski et al. |
| 6,210,408 B1 | 4/2001 | Chandrasekaran et al. |
| 6,217,575 B1 | 4/2001 | Devore et al. |
| 6,221,061 B1 | 4/2001 | Engelson et al. |
| 6,228,076 B1 | 5/2001 | Winston et al. |
| 6,245,054 B1 | 6/2001 | Fuimaono et al. |
| 6,267,758 B1 | 7/2001 | Daw et al. |
| 6,283,983 B1 | 9/2001 | Makower et al. |
| 6,292,678 B1 | 9/2001 | Hall et al. |
| 6,293,945 B1 | 9/2001 | Parins et al. |
| 6,296,615 B1 | 10/2001 | Brockway et al. |
| 6,296,636 B1 | 10/2001 | Cheng et al. |
| 6,302,898 B1 | 10/2001 | Edwards et al. |
| 6,304,769 B1 | 10/2001 | Arenson et al. |
| 6,315,777 B1 | 11/2001 | Comben |
| 6,328,699 B1 | 12/2001 | Eigler et al. |
| 6,360,128 B2 | 3/2002 | Kordis et al. |
| 6,364,877 B1 | 4/2002 | Goble et al. |
| 6,385,472 B1 | 5/2002 | Hall et al. |
| 6,394,976 B1 | 5/2002 | Winston et al. |
| 6,395,002 B1 | 5/2002 | Ellman et al. |
| 6,419,674 B1 | 7/2002 | Bowser et al. |
| 6,428,551 B1 | 8/2002 | Hall et al. |

(56) References Cited

U.S. PATENT DOCUMENTS

| | | |
|---|---|---|
| 6,450,989 B2 | 9/2002 | Dubrul et al. |
| 6,475,214 B1 | 11/2002 | Moaddeb |
| 6,485,485 B1 | 11/2002 | Winston et al. |
| 6,508,754 B1 | 1/2003 | Liprie et al. |
| 6,524,303 B1 | 2/2003 | Garibaldi |
| 6,530,923 B1 | 3/2003 | Dubrul et al. |
| 6,554,827 B2 | 4/2003 | Chandrasekaran et al. |
| 6,562,031 B2 | 5/2003 | Chandrasekaran et al. |
| 6,562,049 B1 | 5/2003 | Norlander et al. |
| 6,565,562 B1 | 5/2003 | Shah et al. |
| 6,607,529 B1 | 8/2003 | Jones et al. |
| 6,632,222 B1 | 10/2003 | Edwards et al. |
| 6,639,999 B1 | 10/2003 | Cookingham et al. |
| 6,650,923 B1 | 11/2003 | Lesh et al. |
| 6,651,672 B2 | 11/2003 | Roth |
| 6,662,034 B2 | 12/2003 | Segner et al. |
| 6,663,621 B1 | 12/2003 | Winston et al. |
| 6,702,811 B2 | 3/2004 | Stewart et al. |
| 6,709,444 B1 | 3/2004 | Makower |
| 6,723,052 B2 | 4/2004 | Mills |
| 6,733,511 B2 | 5/2004 | Hall et al. |
| 6,740,103 B2 | 5/2004 | Hall et al. |
| 6,752,800 B1 | 6/2004 | Winston et al. |
| 6,755,816 B2 | 6/2004 | Ritter et al. |
| 6,811,544 B2 | 11/2004 | Schaer |
| 6,814,733 B2 | 11/2004 | Schwartz et al. |
| 6,820,614 B2 | 11/2004 | Bonutti |
| 6,834,201 B2 | 12/2004 | Gillies et al. |
| 6,842,639 B1 | 1/2005 | Winston et al. |
| 6,852,109 B2 | 2/2005 | Winston et al. |
| 6,855,143 B2 | 2/2005 | Davison et al. |
| 6,860,856 B2 | 3/2005 | Ward et al. |
| 6,869,431 B2 | 3/2005 | Maguire et al. |
| 6,911,026 B1 | 6/2005 | Hall et al. |
| 6,951,554 B2 | 10/2005 | Johansen et al. |
| 6,951,555 B1 | 10/2005 | Suresh et al. |
| 6,955,675 B2 | 10/2005 | Jain |
| 6,970,732 B2 | 11/2005 | Winston et al. |
| 6,980,843 B2 | 12/2005 | Eng et al. |
| 7,029,470 B2 | 4/2006 | Francischelli et al. |
| 7,056,294 B2 | 6/2006 | Khairkhahan et al. |
| 7,083,566 B2 | 8/2006 | Tornes et al. |
| 7,112,197 B2 | 9/2006 | Hartley et al. |
| 7,335,197 B2 | 2/2008 | Sage et al. |
| 7,618,430 B2 | 11/2009 | Scheib |
| 7,651,492 B2 | 1/2010 | Wham |
| 7,666,203 B2 | 2/2010 | Chanduszko et al. |
| 7,678,081 B2 | 3/2010 | Whiting et al. |
| 7,682,360 B2 | 3/2010 | Guerra |
| 7,828,796 B2 | 11/2010 | Wong et al. |
| 7,900,928 B2 | 3/2011 | Held et al. |
| 8,192,425 B2 | 6/2012 | Mirza et al. |
| 8,257,323 B2 | 9/2012 | Joseph et al. |
| 8,388,549 B2 | 3/2013 | Paul et al. |
| 8,500,697 B2 | 8/2013 | Kurth et al. |
| 8,882,697 B2 * | 11/2014 | Celermajer ............... A61F 2/06 604/9 |
| 11,339,579 B1 | 5/2022 | Stearns |
| 2001/0012934 A1 | 8/2001 | Chandrasekaran et al. |
| 2001/0021867 A1 | 9/2001 | Kordis et al. |
| 2002/0019644 A1 | 2/2002 | Hastings et al. |
| 2002/0022781 A1 | 2/2002 | McIntire et al. |
| 2002/0022836 A1 | 2/2002 | Goble et al. |
| 2002/0035361 A1 | 3/2002 | Houser et al. |
| 2002/0087153 A1 | 7/2002 | Roschak et al. |
| 2002/0087156 A1 | 7/2002 | Maguire et al. |
| 2002/0111618 A1 | 8/2002 | Stewart et al. |
| 2002/0123749 A1 | 9/2002 | Jain |
| 2002/0147485 A1 | 10/2002 | Mamo et al. |
| 2002/0169377 A1 | 11/2002 | Khairkhahan et al. |
| 2002/0188302 A1 | 12/2002 | Berg et al. |
| 2002/0198521 A1 | 12/2002 | Maguire |
| 2003/0032929 A1 | 2/2003 | Mcguckin |
| 2003/0040742 A1 | 2/2003 | Underwood et al. |
| 2003/0144658 A1 | 7/2003 | Schwartz et al. |
| 2003/0158480 A1 | 8/2003 | Tornes et al. |
| 2003/0163153 A1 | 8/2003 | Scheib |
| 2003/0225392 A1 | 12/2003 | Mcmichael et al. |
| 2004/0015162 A1 | 1/2004 | Mcgaffigan |
| 2004/0024396 A1 | 2/2004 | Eggers |
| 2004/0030328 A1 | 2/2004 | Eggers et al. |
| 2004/0044350 A1 | 3/2004 | Martin et al. |
| 2004/0073243 A1 | 4/2004 | Sepetka et al. |
| 2004/0077948 A1 | 4/2004 | Violante et al. |
| 2004/0116851 A1 | 6/2004 | Johansen et al. |
| 2004/0127963 A1 | 7/2004 | Uchida et al. |
| 2004/0133113 A1 | 7/2004 | Krishnan |
| 2004/0133130 A1 | 7/2004 | Ferry et al. |
| 2004/0143256 A1 | 7/2004 | Bednarek |
| 2004/0147950 A1 | 7/2004 | Mueller et al. |
| 2004/0181213 A1 | 9/2004 | Gondo |
| 2004/0230188 A1 | 11/2004 | Cioanta et al. |
| 2005/0004585 A1 | 1/2005 | Hall et al. |
| 2005/0010208 A1 | 1/2005 | Winston et al. |
| 2005/0049628 A1 | 3/2005 | Schweikert et al. |
| 2005/0059966 A1 | 3/2005 | Mcclurken et al. |
| 2005/0065507 A1 | 3/2005 | Hartley et al. |
| 2005/0085806 A1 | 4/2005 | Auge et al. |
| 2005/0096529 A1 | 5/2005 | Cooper et al. |
| 2005/0101984 A1 | 5/2005 | Chanduszko et al. |
| 2005/0119556 A1 | 6/2005 | Gillies et al. |
| 2005/0137527 A1 | 6/2005 | Kunin |
| 2005/0149012 A1 | 7/2005 | Penny et al. |
| 2005/0203504 A1 | 9/2005 | Wham et al. |
| 2005/0203507 A1 | 9/2005 | Truckai et al. |
| 2005/0261607 A1 | 11/2005 | Johansen et al. |
| 2005/0288631 A1 | 12/2005 | Lewis et al. |
| 2006/0041253 A1 | 2/2006 | Newton et al. |
| 2006/0074398 A1 | 4/2006 | Whiting et al. |
| 2006/0079769 A1 | 4/2006 | Whiting et al. |
| 2006/0079787 A1 | 4/2006 | Whiting et al. |
| 2006/0079884 A1 | 4/2006 | Manzo et al. |
| 2006/0085054 A1 | 4/2006 | Zikorus et al. |
| 2006/0089638 A1 | 4/2006 | Carmel et al. |
| 2006/0106375 A1 | 5/2006 | Werneth et al. |
| 2006/0135962 A1 | 6/2006 | Kick et al. |
| 2006/0142756 A1 | 6/2006 | Davies et al. |
| 2006/0189972 A1 | 8/2006 | Grossman |
| 2006/0241586 A1 | 10/2006 | Wilk |
| 2006/0247672 A1 | 11/2006 | Vidlund et al. |
| 2006/0264927 A1 | 11/2006 | Ryan |
| 2006/0276710 A1 | 12/2006 | Krishnan |
| 2007/0060879 A1 | 3/2007 | Weitzner et al. |
| 2007/0066975 A1 | 3/2007 | Wong et al. |
| 2007/0118099 A1 | 5/2007 | Trout, III |
| 2007/0123964 A1 | 5/2007 | Davies et al. |
| 2007/0167775 A1 | 7/2007 | Kochavi et al. |
| 2007/0208256 A1 | 9/2007 | Marilla |
| 2007/0225681 A1 | 9/2007 | House |
| 2007/0270791 A1 | 11/2007 | Wang et al. |
| 2008/0039865 A1 | 2/2008 | Shaher et al. |
| 2008/0042360 A1 | 2/2008 | Veikley |
| 2008/0086120 A1 | 4/2008 | Mirza et al. |
| 2008/0097213 A1 | 4/2008 | Carlson et al. |
| 2008/0108987 A1 | 5/2008 | Bruszewski et al. |
| 2008/0146918 A1 | 6/2008 | Magnin et al. |
| 2008/0171934 A1 | 7/2008 | Greenan et al. |
| 2008/0208121 A1 | 8/2008 | Youssef et al. |
| 2008/0275439 A1 | 11/2008 | Francischelli et al. |
| 2009/0105742 A1 | 4/2009 | Kurth et al. |
| 2009/0138009 A1 | 5/2009 | Mswanathan et al. |
| 2009/0163850 A1 | 6/2009 | Betts et al. |
| 2009/0177114 A1 | 7/2009 | Chin et al. |
| 2009/0264977 A1 | 10/2009 | Bruszewski et al. |
| 2010/0087789 A1 | 4/2010 | Leeflang et al. |
| 2010/0125282 A1 | 5/2010 | Machek et al. |
| 2010/0168684 A1 | 7/2010 | Ryan |
| 2010/0179632 A1 | 7/2010 | Bruszewski et al. |
| 2010/0191142 A1 | 7/2010 | Paul et al. |
| 2010/0194047 A1 | 8/2010 | Sauerwine |
| 2011/0046619 A1 | 2/2011 | Ducharme |
| 2011/0152716 A1 | 6/2011 | Chudzik et al. |
| 2011/0160592 A1 | 6/2011 | Mitchell |
| 2011/0190763 A1 | 8/2011 | Urban et al. |

(56) References Cited

U.S. PATENT DOCUMENTS

| | | |
|---|---|---|
| 2012/0232546 A1 | 9/2012 | Mirza et al. |
| 2012/0259263 A1 | 10/2012 | Celermajer et al. |
| 2012/0265055 A1 | 10/2012 | Melsheimer et al. |
| 2012/0330156 A1 | 12/2012 | Brown et al. |
| 2013/0184551 A1 | 7/2013 | Paganelli et al. |
| 2013/0184735 A1 | 7/2013 | Fischell et al. |
| 2013/0282084 A1 | 10/2013 | Mathur et al. |
| 2014/0206987 A1 | 7/2014 | Urbanski et al. |
| 2014/0296769 A1 | 10/2014 | Hyde et al. |
| 2015/0375011 A1 | 12/2015 | Spittle et al. |
| 2016/0220741 A1 | 8/2016 | Garrison et al. |
| 2018/0043139 A1 | 2/2018 | Haindl |
| 2019/0015644 A1 | 1/2019 | Thomspon Smith et al. |
| 2019/0021763 A1 | 1/2019 | Zhou et al. |
| 2019/0167305 A1 | 6/2019 | Pedersen et al. |
| 2019/0247035 A1 | 8/2019 | Gittard et al. |

OTHER PUBLICATIONS

Extended European Search Report and Search Opinion received for European Application No. 21748044.1, mailed on Jan. 5, 2024, 8 pages.

\* cited by examiner

GUIDEWIRE FOR REDUCING HOOP STRESS

TECHNICAL FIELD

This document relates to the technical field of (and is not limited to) a medical guidewire assembly configured to reduce, at least in part, hoop stress (also called circumferential stress) surrounding a puncture hole extending through the tissue of a patient (and method therefor).

BACKGROUND

Known medical devices, such as a medical guidewire assembly, are configured to facilitate a medical procedure, and help healthcare providers diagnose and/or treat medical conditions of patients.

SUMMARY

It will be appreciated that there exists a need to mitigate (at least in part) at least one problem associated with the known (existing) medical guidewire assemblies (also called the existing technology). After much study of, and experimentation with, the known (existing) medical guidewire assemblies, an understanding (at least in part) of the problem and its solution have been identified (at least in part) and are articulated (at least in part) as follows:

There are existing problem(s) that may require a technical solution, such as the case where known medical devices (such as transseptal dilators) have a piercing stylet (configured for transseptal puncture) which is characterized by having an extremely sharp distal tip that enhances tissue puncture efficacy and/or lowers the required applied force (to move the known medical device) compared to the amount that may be required for sharpened hypotubes. A relatively lower applied force (force input) sufficient enough to move the known medical devices for the purpose of puncturing the tissue (a biological wall, such as the fossa ovalis in the heart) of a patient may be facilitated by using a relatively thin and flexible material with a pointed bevel positioned at a distal tip thereof (and may have, preferably, a relatively smaller cross-sectional profile, etc.). As the known piercing stylet is advanced across (through) the biological wall (such as the inter-atrial septum), an outer diameter of the piercing stylet may increase, but the actual puncture hole that is created remains relatively small, and as a result there may be a substantial amount of hoop stress formed, or existing, at (or around) the puncture hole (that is, at the site of tissue expansion once the known medical devices pass through the puncture hole). As a result, there may be required a greater amount of an applied force (input force) received by the known medical device for the purpose of moving the known medical device (such as dilator) across (through) the puncture site. The relatively higher amount of applied force (movement force) may result in (A) a buildup of tension (forces) around the puncture site and/or (B) a sudden springing of (or jumping across of) the inter-atrial septum surrounding the medical device (at the puncture hole) as the medical device moved through the initially formed puncture hole. Unpredictable behavior like this may be undesirable as this arrangement may lead to unintended patient injury and/or procedural surgical delay(s). Thus, it would be desirable to have features associated with the piercing stylet configured to expand (increase the circumference of) the initially formed puncture hole (site) to better allow the crossing of known medical device (through the initially formed puncture hole or through the biological wall), and/or may enhance (at least in part) their functionality and/or efficacy.

For instance, a puncture hole created (initially formed) using a relatively thinner piercing stylet may initially form a smaller-sized puncture hole through the tissue wall. For instance, the puncture hole may be created (formed) with a 0.0012-inch (or less) diameter or a 0.0002 inch diameter. The relatively smaller size of the initial puncture hole may create greater difficulty for the crossing of the medical device through the initially formed hole passing through the biological wall. Therefore, a relatively greater initial application force may be required to get the distal tip of the known medical device across this size of access hole (initially formed puncture hole).

Forcing the movement of a known dilator (a known medical device) through a 0.0012 inch or a 0.0002-inch inner diameter sized puncture hole (also called a micropuncture hole), etc., may be made with the known piercing stylet. However, the hoop stresses imposed by the intact tissue on the piercing stylet may increase the input applied movement force (to be applied to the known medical device) required to bring the known medical device across (that is, through the tissue wall) as compared to the ease of potentially utilizing a relatively larger instance of the puncture hole (that may be created with a different puncture device).

It may be desirable to decrease the mechanical input (applied) force required to puncture tissue compared to known medical devices (having mechanical needles). However, the smaller puncture hole that is (initially) created as a result of the reduced cross-sectional profile of the sharp distal tip may result in an undesired amount of hoop stress at the device-tissue interface, and/or may increase the force necessary to cross the inter-atrial septum (such as, with a known transseptal dilator, etc.).

It may be desirable to provide a piercing stylet with a cutting section along a body of the medical device. The cutting section may be configured to cut tissue to expand the puncture hole that was initially created in the tissue wall (such as the fossa ovalis) to cross the inter-atrial septum as the piercing stylet is advanced through the puncture site. The fossa ovalis is a depression in the right atrium of the heart, at the level of the interatrial septum, the wall between right and left atrium. The fossa ovalis is the remnant of a thin fibrous sheet that covered the foramen ovale during fetal development. By expanding the puncture hole created by the puncture device, the hoop stress at the device-tissue interface may be reduced (at least in part). This arrangement may enable relatively easier crossing of the medical device across the inter-atrial septum (through the biological wall) while simultaneously maintaining the reduced input (applied) force that may be required to mechanically puncture the biological wall or tissue (such as the fossa ovalis).

The possible uses and/or applications of the solution may increase the size of a puncture site (hole) (increase the circumference) in the tissue (the fossa ovalis) which may reduce, at least in part, the crossing force of the medical device through the initially formed puncture site (that is, through the inter-atrial septum during a transseptal catheterization procedure, etc.).

To mitigate, at least in part, at least one problem associated with the existing technology, there is provided (in accordance with a first aspect) an apparatus.

The apparatus includes and is not limited to (comprises) a medical guidewire assembly that is, at least in part, installable into, and movable (at least in part) along a guidewire introducer. The guidewire introducer, with the medical guidewire assembly installed therein, is insertable, at least in part, into a patient. The medical guidewire assembly is configured to reduce, at least in part, the hoop stress surrounding a puncture hole extending through the tissue of the patient in response to movement, at least in part, of the medical guidewire assembly through the puncture hole (after the puncture hole has been initially formed).

To mitigate, at least in part, at least one problem associated with the existing technology, there is provided (in accordance with a second aspect) an apparatus. The apparatus includes and is not limited to (comprises) a medical guidewire assembly. The medical guidewire assembly is installable, at least in part, into, and movable along (at least in part) a guidewire introducer. The guidewire introducer (with the medical guidewire assembly installed, at least in part, therein) is insertable, at least in part, into a patient. The medical guidewire assembly is also configured to form, at least in part, a puncture hole through the tissue of the patient in response to movement, at least in part, of the medical guidewire assembly from the guidewire introducer after the guidewire introducer and the medical guidewire assembly have been inserted, at least in part, into the patient. The medical guidewire assembly is also configured to cut, at least in part, a portion of the tissue proximately surrounding the puncture hole, and reduce, at least in part, the hoop stress surrounding the puncture hole (once the puncture hole is cut by the medical guidewire assembly, and/or in response to further removal or movement, at least in part, of the medical guidewire assembly through, or relative to, the puncture hole (after the puncture hole has been initially formed).

To mitigate, at least in part, at least one problem associated with the existing technology, there is provided (in accordance with a third aspect) an apparatus. The apparatus includes and is not limited to (comprises) a medical guidewire assembly. The medical guidewire assembly is installable, at least in part, into, and movable, at least in part, along a guidewire introducer. The guidewire introducer (with the medical guidewire assembly installed, at least in part, therein) is insertable, at least in part, into a patient. The medical guidewire assembly includes an elongated section. A distal portion extends from the elongated section. The distal portion is, at least in part, installable into (and movable, at least in part, along) an interior longitudinal channel of the guidewire introducer and through an exit portal of the guidewire introducer. The guidewire introducer, with the medical guidewire assembly installed therein, is insertable, at least in part, into a confined space defined by a patient. A piercing stylet assembly extends from the distal portion. The piercing stylet assembly is configured to physically form, at least in part, a puncture hole through the tissue of the patient in response to movement, at least in part, of the distal portion from the exit portal of the guidewire introducer, and the distal portion with the piercing stylet assembly are moved toward, and through, the tissue of the patient (after the guidewire introducer and the medical guidewire assembly have been inserted, at least in part, into the confined space defined by the patient). A cutting assembly is spaced apart from the distal portion. The cutting assembly is mounted to the elongated section. The cutting assembly is configured to be removable from the exit portal of the guidewire introducer. The cutting assembly is also configured to cut, at least in part, a portion of the tissue proximately surrounding the puncture hole (which is defined by the tissue). This is done in such a way that the cutting assembly reduces, at least in part, the hoop stress surrounding the puncture hole (preferably, this is done after or once the puncture hole is cut by the cutting assembly, and/or in response to movement, at least in part, of the cutting assembly through, or relative to, the exit portal of the guidewire introducer and then through the puncture hole after the puncture hole has been initially formed, at least in part, by the piercing stylet assembly).

To mitigate, at least in part, at least one problem associated with the existing technology, there is provided (in accordance with a fourth aspect) a method. The method is for reducing, at least in part, the hoop stress surrounding a puncture hole defined by the tissue of a patient. The method includes and is not limited to (comprises) operation (A), operation (B), operation (C) and operation (D). Operation (A) includes installing a medical guidewire assembly, at least in part, into a guidewire introducer. The guidewire introducer (with the medical guidewire assembly installed, at least in part, therein) is insertable, at least in part, into a patient. The medical guidewire assembly includes a distal portion extending from an elongated section of the medical guidewire assembly. The medical guidewire assembly also includes a piercing stylet assembly extending from the distal portion. The medical guidewire assembly also includes a cutting assembly that is spaced apart from the distal portion, and the cutting assembly is mounted to the elongated section. The cutting assembly is configured to be removable from the exit portal of the guidewire introducer. The guidewire introducer defines the exit portal and an interior longitudinal channel in communication with the exit portal. Operation (B) includes inserting the guidewire introducer with the medical guidewire assembly, at least in part, into the confined space defined by the patient. Operation (C) includes moving, at least in part, the distal portion of the medical guidewire assembly along, at least in part, the interior longitudinal channel of the guidewire introducer and through the exit portal of the guidewire introducer. Operation (D) includes removing, at least in part, the piercing stylet assembly and the distal portion through the exit portal of the guidewire introducer, and the distal portion along with piercing stylet assembly are moved toward, and through, the tissue of the patient (once or after the exit portal of the guidewire introducer is positioned proximate to the tissue of the patient). This is done in such a way that the piercing stylet assembly, in use, initially physically forms, at least in part, a puncture hole so that the puncture hole extends through the tissue of the patient. Operation (E) includes removing (moving), at least in part, the cutting assembly from (through) the exit portal of the guidewire introducer and then through the puncture hole defined by the tissue (after the puncture hole has been initially formed, at least in part, by the piercing stylet assembly); this is done in such a way that the cutting assembly cuts, at least in part, a portion of the tissue proximately surrounding the puncture hole defined by the tissue, and the cutting assembly reduces, at least in part, the hoop stress surrounding the puncture hole.

Other aspects are identified in the claims. Other aspects and features of the non-limiting embodiments may now become apparent to those skilled in the art upon review of the following detailed description of the non-limiting embodiments with the accompanying drawings. This Summary is provided to introduce concepts in simplified form that are further described below in the Detailed Description. This Summary is not intended to identify potentially key features or possible essential features of the disclosed subject matter, and is not intended to describe each disclosed embodiment or every implementation of the disclosed subject matter. Many other novel advantages, features, and relationships will become apparent as this description proceeds. The figures and the description that follow more particularly exemplify illustrative embodiments.

BRIEF DESCRIPTION OF THE DRAWINGS

The non-limiting embodiments may be more fully appreciated by reference to the following detailed description of the non-limiting embodiments when taken in conjunction with the accompanying drawings, in which.

Figure 1:
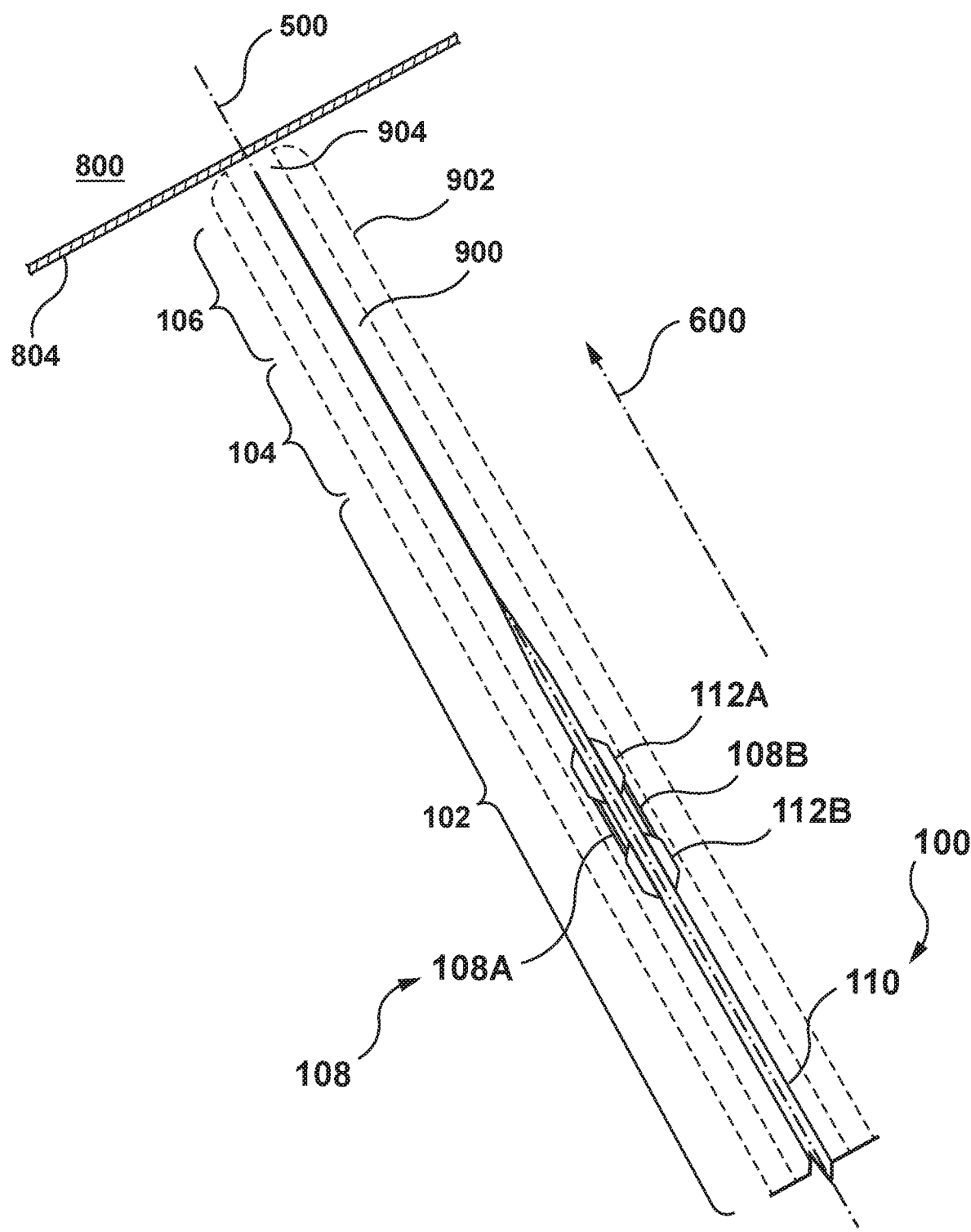
FIG. 1 depicts a side view of an embodiment of a medical guidewire assembly.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted. Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, and well-understood, elements that are useful in commercially feasible embodiments are often not depicted to provide a less obstructed view of the embodiments of the present disclosure.

LISTING OF REFERENCE NUMERALS USED IN THE DRAWINGS medical guidewire assembly 100
elongated section 102
distal portion 104
stylet assembly 106
cutting assembly 108
spaced-apart cutting sections 108A, 108B
outer surface 110
guard device 112
spaced-apart guard devices 112A, 112B
longitudinal axis 500
movement axis 600
movement axis 602
movement axis 602
hoop stress 700
patient 800
puncture hole 802
tissue 804
interior longitudinal channel 900
guidewire introducer 902
exit portal 904

DETAILED DESCRIPTION OF THE NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the claim is defined by the claims (in which the claims may be amended during patent examination after the filing of this application). For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described. It will be appreciated that the scope of the meaning of a device configured to be coupled to an item (that is, to be connected to, to interact with the item, etc.) is to be interpreted as the device being configured to be coupled to the item, either directly or indirectly. Therefore, "configured to" may include the meaning "either directly or indirectly" unless specifically stated otherwise.

Figure 2:
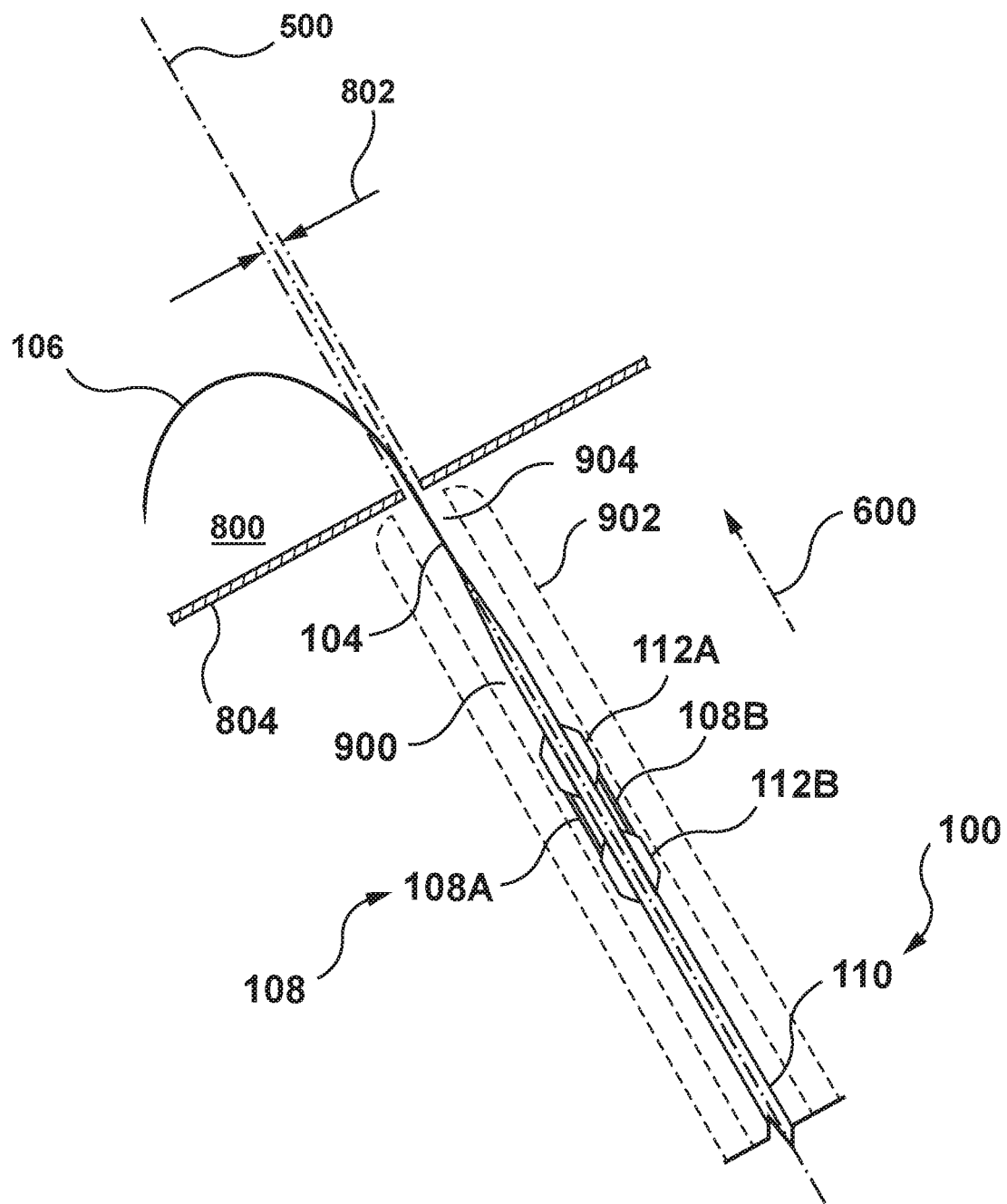
FIG. 2 depicts another side view of an embodiment of the medical guidewire assembly of FIG. 1.
Figure 3:
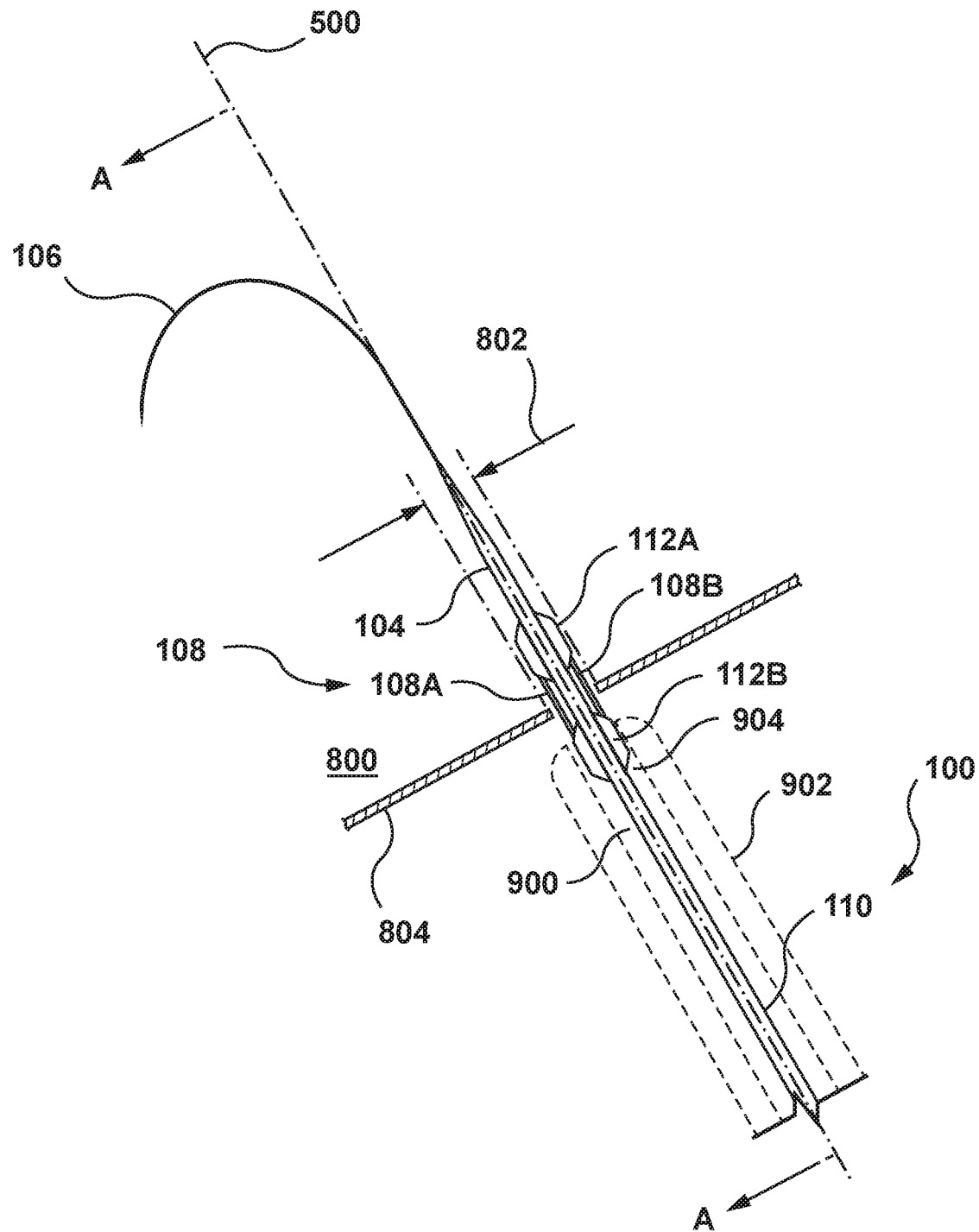
FIG. 3 depicts yet another side view of an embodiment of the medical guidewire assembly of FIG. 1.

FIG. 1, FIG. 2 and FIG. 3 depict side views of embodiments of a medical guidewire assembly 100.

Figure 4:
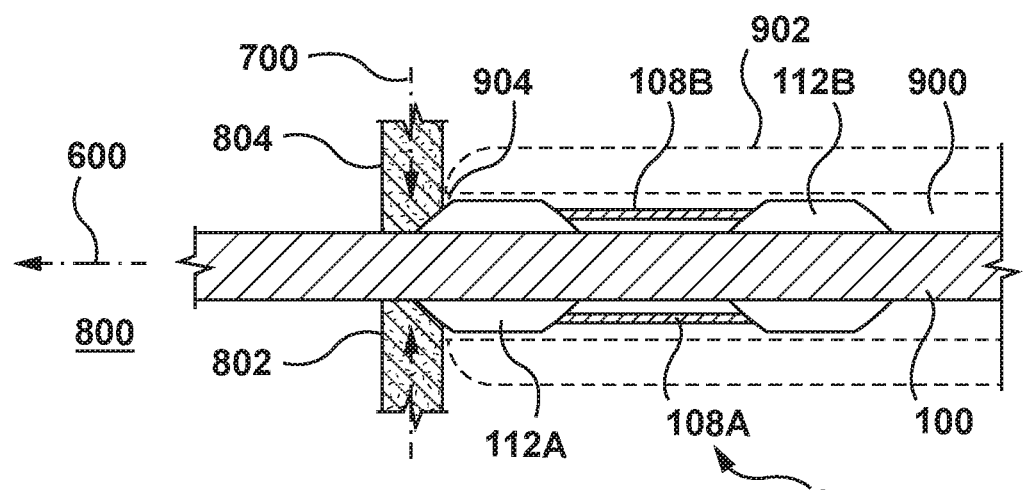
FIG. 4, FIG. 5 and FIG. 6 depict cross-sectional views of embodiments of the medical guidewire assembly of FIG. 3.
Figure 5:
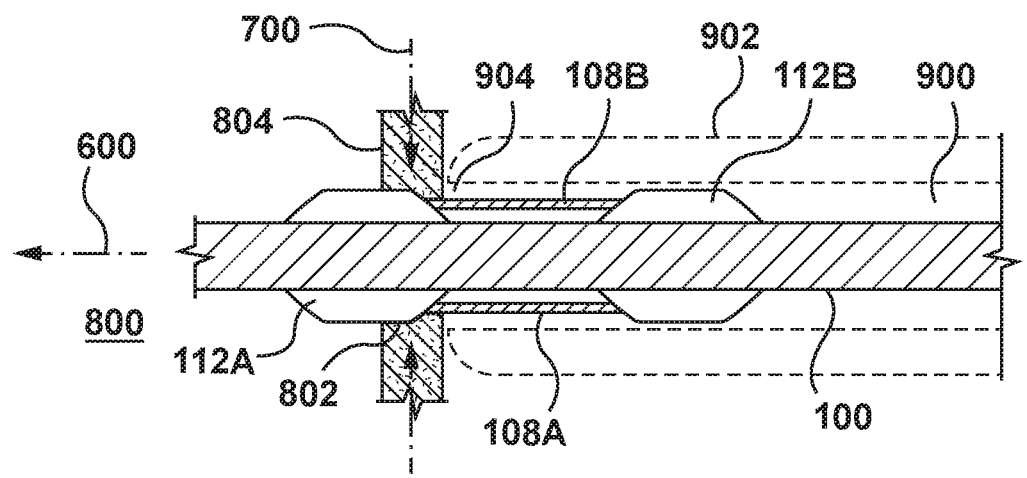
Figure 6:
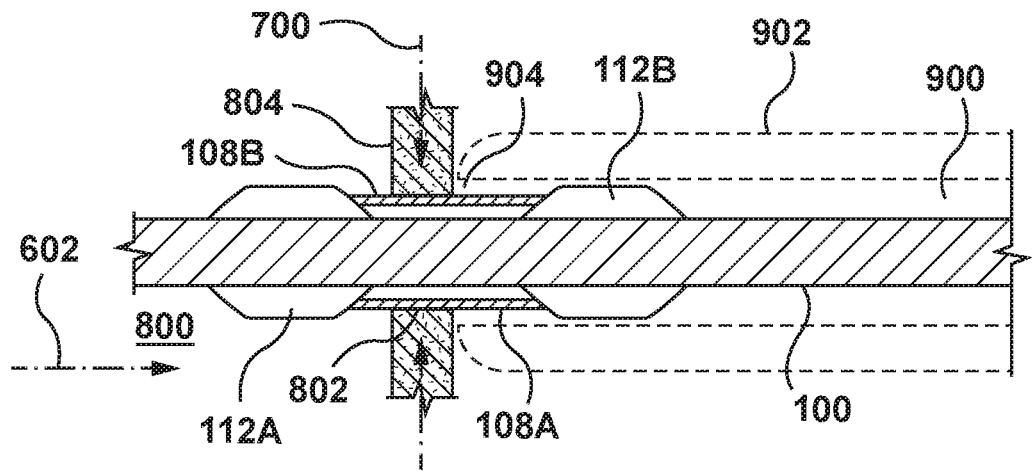

FIG. 4, FIG. 5 and FIG. 6 depict cross-sectional views of embodiments of the medical guidewire assembly 100 of FIG. 3. The cross-sectional views of FIG. 4, FIG. 5 and FIG. 6 are taken along a cross-sectional line A-A through the medical guidewire assembly 100 of FIG. 3.

Referring to the embodiment as depicted in FIG. 1, the medical guidewire assembly 100 is configured to be positioned (placed into), at least in part, a patient 800 having tissue 804 (such as a biological wall). The medical guidewire assembly 100 is configured to be movable along a movement axis 600 (also called a movement axis) toward the tissue 804 (such as a biological wall). The medical guidewire assembly 100 has a longitudinal axis 500 extending therealong. In accordance with a preferred embodiment, the medical guidewire assembly 100 is, at least in part, installable into, and movable along, a guidewire introducer 902. The guidewire introducer 902 (with the medical guidewire assembly 100 installed therein) is insertable, at least in part, into a patient 800.

Referring to the embodiment as depicted in FIG. 1, the medical guidewire assembly 100 (in accordance with a specific embodiment) has a distal portion 104 (a tip section) that is positionable (configured to be placed into) the patient 800. The distal portion 104 is positionable proximate to the tissue 804. In accordance with a specific embodiment, the medical guidewire assembly 100 includes a piercing stylet assembly 106 (mounted to the end portion of the distal portion 104). In accordance with a specific embodiment, the medical guidewire assembly 100 includes a cutting assembly 108 that is spaced apart from the piercing stylet assembly 106. The cutting assembly 108, preferably, includes spaced-apart cutting sections (108A, 108B) positioned (preferably) on opposite sides of the medical guidewire assembly 100. The spaced-apart cutting sections (108A, 108B) are spaced apart from the opposite sides of the medical guidewire assembly 100. The spaced-apart cutting sections (108A, 108B) may include raised cutting wires (a pair of raised cutting wires), etc., and any equivalent thereof. The cutting assembly 108 (preferably) includes a guard device 112 positioned on at least the front leading portion of the cutting assembly 108. The guard device 112, preferably, includes a first guard device 112A and a second guard device 112B (spaced-apart guard devices). The spaced-apart guard devices (112A, 112B) are positioned on (at) each end (each respective end, or respective terminal portion) of the spaced-apart cutting sections (108A, 108B).

Referring to the embodiment as depicted in FIG. 2, the medical guidewire assembly 100 (that is, the distal portion 104) is configured to be movable toward the tissue 804. After the medical guidewire assembly 100 (such as the distal portion 104) is made to move toward the tissue 804, the medical guidewire assembly 100 (preferably, the distal portion 104) initially forms a puncture hole 802 through the tissue 804 (this is done in response to movement, at least in part, of the distal portion 104 of the medical guidewire assembly 100 toward (at least in part) and through (at least in part) the tissue 804).

Referring to the embodiment as depicted in FIG. 3, after initial formation of the puncture hole 802 through the tissue 804 (as depicted in FIG. 2), the medical guidewire assembly 100 (the distal portion 104) is further made to move (at least in part) through the tissue 804. This is done in such a way that the medical guidewire assembly 100 initially further opens (widens) the puncture hole 802 (in comparison to the size of the puncture hole 802, as depicted in the embodiment of FIG. 2).

Referring to the embodiment as depicted in FIG. 4 (which is a first cross-sectional view taken along the cross-sectional line A-A through the medical guidewire assembly 100 of FIG. 3), the initial formation of the puncture hole 802 (of FIG. 2) is depicted. The medical guidewire assembly 100 is movable along the movement axis 600. A larger portion (section) of the medical guidewire assembly 100 that is wider (larger) than the initial formation (initial cross-section) of the puncture hole 802 is made to pass through the initial formation of the puncture hole 802. A relatively large amount of hoop stress 700 is formed around the initial formation of the puncture hole 802 (as the larger portion of the medical guidewire assembly 100 is moved through the initial formation of the puncture hole 802).

Referring to the embodiment as depicted in FIG. 5 (which is a second cross-sectional view taken along the cross-sectional line A-A through the medical guidewire assembly 100 of FIG. 3), as the medical guidewire assembly 100 is further moved, at least in part, through the initial formation of the puncture hole 802, the relatively large amount of hoop stress 700 is reduced (at least in part) by the medical guidewire assembly 100 acting on (cutting or reforming) the initial formation of the puncture hole 802. The medical guidewire assembly 100 is movable along the movement axis 600. In this manner, the puncture hole 802 becomes reshaped (resized), and the amount or magnitude of the hoop stress 700 is reduced as more of the larger portion of the medical guidewire assembly 100 passes (moves) through the initial formation of the puncture hole 802.

Referring to the embodiment as depicted in FIG. 6 (which is a third cross-sectional view taken along the cross-sectional line A-A through the medical guidewire assembly 100 of FIG. 3), the medical guidewire assembly 100 is, again, further moved, at least in part, through the initial formation of the puncture hole 802. The amount of hoop stress 700 is further reduced (at least in part) by the medical guidewire assembly 100 further acting on (further cutting or reforming) the initial formation of the puncture hole 802. The medical guidewire assembly 100 is movable along the movement axis 602 (also called a movement direction). In this manner, the puncture hole 802 becomes further reshaped (further resized), and the amount or magnitude of the hoop stress 700 is further reduced as the larger portion of the medical guidewire assembly 100 further passes (moves) through the initial formation of the puncture hole 802. It will be appreciated that the magnitude of (the amount of) hoop stress 700 surrounding the puncture hole 802 for the embodiments as depicted in FIG. 4 and/or FIG. 5 is greater than the magnitude of the hoop stress 700, as depicted in the embodiment of FIG. 6. A technical effect of the medical guidewire assembly 100 is the reduction of the amount of (the magnitude of) the hoop stress 700 such that there may exist a condition for a relatively easier crossing (conveyance) of the medical guidewire assembly 100 (and/or the guidewire introducer 902) through (at least in part) the puncture hole 802 (such as, across the inter-atrial septum of the heart of the patient 800) while the medical guidewire assembly 100 permits, at least in part, a reduced input force that may be required to initially form the puncture hole 802 (such as, mechanically puncture the fossa ovalis of the heart of the patient 800).

FIG. 7 depicts yet again another side view of an embodiment of the medical guidewire assembly 100 of FIG. 1.

Figure 7:
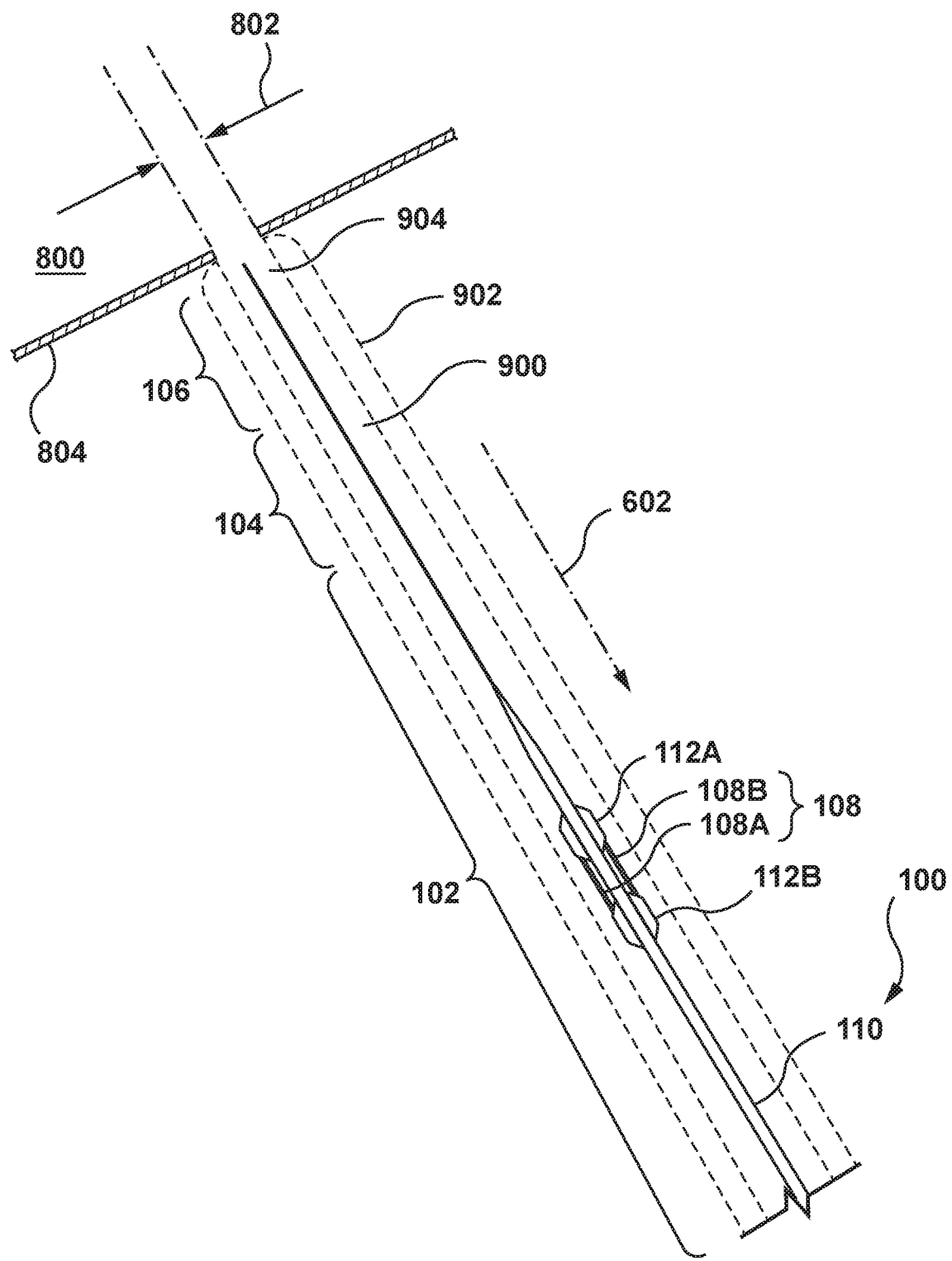
FIG. 7 depicts yet again another side view of an embodiment of the medical guidewire assembly of FIG. 1.

Referring to the embodiment as depicted in FIG. 7, after the hoop stress 700 surrounding the puncture hole 802 is reduced (at least in part), the medical guidewire assembly 100 (the distal portion 104) may be retracted (moved or removed) from the puncture hole 802. The medical guidewire assembly 100 is configured to be movable along a movement direction 602 (also called a movement axis) away from the tissue 804 (such as a biological wall).

Referring to the embodiment as depicted in FIG. 1, the medical guidewire assembly 100 may include a shape memory material (and any equivalent thereof), such as a nitinol alloy (and/or any equivalent thereof). Nickel titanium, also known as nitinol, is a metal alloy of nickel and titanium, where the two elements may be present in roughly equal atomic percentages (such as, nitinol 55, nitinol 60, etc.). Nitinol alloys exhibit two closely related and unique properties: shape memory effect and superelasticity. A shape memory material is configured to be manipulated and/or deformed followed by a return to the original shape the material was set in. Shape memory materials (SMMs) are configured to recover their original shape from a significant and seemingly plastic deformation in response to a particular stimulus that is applied to the material. This is known as the shape memory effect (SME). Superelasticity (in alloys) may be observed if (when) the shape memory material is deformed at the presence of the stimulus. The medical guidewire assembly 100 is, preferably, biocompatible with the tissue 804. The medical guidewire assembly 100 is configured to be inserted into a confined space defined by the patient 800. The medical guidewire assembly 100 includes (preferably) a relatively thin and flexible wire (an elongated flexible shaft) configured to be inserted into a confined or tortuous space (such as the confined space defined by the patient 800). The medical guidewire assembly 100 includes, preferably, a flexible tube (made from a medical grade material). The medical guidewire assembly 100 is (preferably) impermeable by a bodily fluid. The medical guidewire assembly 100 includes, preferably, SAE (Society of Automotive Engineering) Type 304 Stainless Steel. SAE Type 304 stainless steel contains both chromium (from between 15% to 20%) and nickel (between 2% to 10.5%) metals as the main non-iron constituents. The medical guidewire assembly 100 includes (in accordance with another option) superelastic nitinol. Nitinol alloys exhibit two closely related and unique properties: shape memory effect (SME) and superelasticity (SE; also called pseudoelasticity or PE). Shape memory is the ability of nitinol to undergo deformation at one temperature, then recover its original, undeformed shape upon heating above its transformation temperature. Superelasticity occurs at a narrow temperature range just above its transformation temperature; in this case, no heating is necessary to cause the undeformed shape to recover, and the material exhibits enormous elasticity, from about ten (10) to thirty (30) times that of ordinary metal. The medical guidewire assembly 100 includes (in accordance with a preferred embodiment) any biocompatible material having properties suitable for sufficient performance (such as dielectric strength, thermal performance, insulation and corrosion, water and/or heat resistance) for compliance with safe performance required by industrial and regulatory safety standards (and/or compatible for medical usage). Reference is made to the following publication for consideration in the selection of a suitable material: *Plastics in Medical Devices: Properties, Requirements, and Applications;* 2nd Edition; author: Vinny R. Sastri; hardcover ISBN: 9781455732012; published: 21 Nov. 2013; publisher: Amsterdam [Pays-Bas]: Elsevier/William Andrew, [2014].

Referring to the embodiment as depicted in FIG. 1, the medical guidewire assembly 100 is, at least in part, installable into, and movable along the guidewire introducer 902 (and any equivalent thereof). The guidewire introducer 902, with the medical guidewire assembly 100 installed therein, is insertable, at least in part, into a patient 800. For instance, for the medical guidewire assembly 100 to be compatible with the guidewire introducer 902, the medical guidewire assembly 100 may have an outer diameter that is about 0.032 inches. The guidewire introducer 902 may include, for instance, a stiff accessory device with (defining) a hollow lumen, a dilator device, a catheter device, etc., and any equivalent thereof. The guidewire introducer 902 may include any type of medical accessory device, and any equivalent thereof. The guidewire introducer 902 is configured to straighten out (at least in part) the medical guidewire assembly 100 so that the piercing stylet assembly 106 (sharp distal tip) may be used to puncture the tissue 804 (such as the fossa ovalis) of the patient 800.

Referring to the embodiment as depicted in FIG. 2, following the initial puncture of (that is, the initial formation of the puncture hole 802 through) the tissue 804, the medical guidewire assembly 100 is advanced (movable) through the puncture hole 802, and the medical guidewire assembly 100 is able to return to its relaxed shape (a more natural shape, unbiased shape) where the distal portion 104 (distal tip) becomes naturally bent or curved, and the piercing stylet assembly 106 points away from the leading edge of the distal portion 104. The distal portion 104 may include a curved distal end (once the distal portion 104 is deployed from the interior of the guidewire introducer 902). The relaxed form of the distal portion 104 may adopt a curvature where the piercing stylet assembly 106 (sharp distal tip) is pointed away from or surrounded by other sections of the distal portion 104. This arrangement helps to mitigate unintended contact of anatomical structures with the piercing stylet assembly 106. The distal portion 104 may be any configuration. The functionality of the raised cutting sections is (preferably) not dependent on the geometry of the distal portion 104.

Referring to the embodiment as depicted in FIG. 2, the piercing stylet assembly 106 is configured to mechanically puncture the tissue 804 (such as the fossa ovalis in the heart). Sharpness may be a subjective term. Every tissue fails (is punctured) when an applied load exceeds the tolerance of the tissue 804. The piercing stylet assembly 106 may be able to mechanically puncture the tissue 804 under a desired or predetermined applied force (applied to the piercing stylet assembly 106). For instance, the piercing stylet assembly 106 may have an expanding and collapsing balloon (known and not depicted) equipped to the medical guidewire assembly 100. The balloon may be inflated to further expand the puncture hole 802, enabling relatively easier crossing of the guidewire introducer 902 through the puncture hole 802 (in a similar way that the cutting assembly 108 may perform or act). For instance, the piercing stylet assembly 106 may include rotating cutting sections (as deployed with an atherectomy device, which is known and not depicted) configured for the removal of arterial plaque. The rotating cutting sections may be implemented for mechanical transseptal puncture where an initial puncture is made (initially formed) followed by small spinning sections attached to the side of the piercing stylet assembly 106 that further expand the initially formed instance of the puncture hole 802 (that is, after the puncture hole 802 has been initially formed). For instance, the piercing stylet assembly 106 may include a radio frequency electrode (known and not depicted) and/or a radio frequency cutting section (known and not depicted) that may be added along the sides of the medical guidewire assembly 100, and may be configured to cut tissue when (once) the piercing stylet assembly 106 is in position and activated accordingly.

Referring to the embodiment as depicted in FIG. 1, there is depicted a first aspect of an apparatus. The apparatus includes and is not limited to (comprises, in accordance with the first aspect) a medical guidewire assembly 100. The medical guidewire assembly 100 is, at least in part, installable into, and movable along a guidewire introducer 902. The guidewire introducer 902, with the medical guidewire assembly 100 installed therein, is insertable, at least in part, into a patient 800.

Referring to the embodiments as depicted in FIG. 1 and FIG. 6 (and in accordance with the first aspect), the medical guidewire assembly 100 is configured to reduce, at least in part, the hoop stress 700 surrounding a puncture hole 802 (surrounding an inner diameter of the puncture hole 802) extending through the tissue 804 of the patient 800. This is done in response to movement (advancement), at least in part, of the medical guidewire assembly 100 through the puncture hole 802 and into (further into) the patient 800 after the puncture hole 802 has been initially formed (by the medical guidewire assembly 100 and/or an aspect or a component thereof). It will be appreciated that the magnitude of the hoop stress 700 surrounding the puncture hole 802 for the embodiments as depicted in FIG. 4 and/or FIG. 5 is greater than the magnitude of the hoop stress 700 as depicted in the embodiment of FIG. 6. A technical effect of the medical guidewire assembly 100 is the reduction of the amount of (the magnitude) hoop stress 700 such that there may exist a condition for a relatively easier crossing (conveyance) of the medical guidewire assembly 100 (and/or the guidewire introducer 902) through (at least in part) the puncture hole 802 (such as, across the inter-atrial septum of the heart of the patient 800) while the medical guidewire assembly 100 permits, at least in part, a reduced input force that may be required to initially form the puncture hole 802 (such as, mechanically puncture the fossa ovalis of the heart of the patient 800).

Referring to the embodiments as depicted in FIG. 1, FIG. 2 and FIG. 6, there is depicted a second aspect of an apparatus.

Referring to the embodiment as depicted in FIG. 1, the apparatus (in accordance with the second aspect) includes and is not limited to (comprises) a medical guidewire assembly 100. The medical guidewire assembly 100 is, at least in part, installable into, and movable along a guidewire introducer 902. The guidewire introducer 902, with the medical guidewire assembly 100 installed therein, is insertable, at least in part, into a patient 800.

Referring to the embodiment as depicted in FIG. 2 (and in accordance with the second aspect), the medical guidewire assembly 100 is configured to form, at least in part, a puncture hole 802 through the tissue 804 of the patient 800. This is done in response to movement (removal includes relative movement between the medical guidewire assembly 100 and the guidewire introducer 902), at least in part, of the medical guidewire assembly 100 from the guidewire introducer 902 (after the guidewire introducer 902 and the medical guidewire assembly 100 have been inserted, at least in part, into the patient 800).

Referring to the embodiment as depicted in FIG. 6 (and in accordance with the second aspect), the medical guidewire assembly 100 is further configured to (A) cut (slice), at least in part, a portion of the tissue proximately surrounding (the inner diameter of the puncture hole 802, or the tissue positioned proximate to) the puncture hole 802, and (B) reduce, at least in part, the hoop stress 700 surrounding the puncture hole 802; this is done, preferably, once (i) the puncture hole 802 is cut (sliced) by the medical guidewire assembly 100, and (ii) in response to further movement (advancement), at least in part, of the medical guidewire assembly 100 through the puncture hole 802 (preferably, after the puncture hole 802 has been initially formed).

Referring to the embodiment as depicted in FIG. 2 (and in accordance with the second aspect), the medical guidewire assembly 100 is movable along an interior longitudinal channel 900 of the guidewire introducer 902 and through an exit portal 904 of the guidewire introducer 902. The guidewire introducer 902 is, preferably, flexible. The medical guidewire assembly 100 is, preferably, flexible. The medical guidewire assembly 100 includes a piercing stylet assembly 106. The piercing stylet assembly 106 is configured to form (cut), at least in part, a puncture hole 802 (puncture site) through the tissue 804 (such as, the fossa ovalis of the heart) of the patient 800. This is done in response to movement (advancement), at least in part, of the piercing stylet assembly 106 from (through) the exit portal 904 of the guidewire introducer 902 after the guidewire introducer 902 and the medical guidewire assembly 100 have been inserted, at least in part, into the confined space defined by the patient 800.

Referring to the embodiments as depicted in FIG. 3 and FIG. 6 (and in accordance with the second aspect), a cutting assembly 108 is configured to cut (slice), at least in part, a portion of the tissue proximately surrounding (the inner diameter of the puncture hole 802, or the tissue positioned proximate to) the puncture hole 802. This is done in such a way that the cutting assembly 108 reduces, at least in part, the hoop stress 700 surrounding the puncture hole 802; this is done once the puncture hole 802 is cut (sliced) by the cutting assembly 108 in response to further movement (advancement), at least in part, of the medical guidewire assembly 100 through the puncture hole 802 (preferably, after the puncture hole 802 has been initially formed).

Referring to the embodiments as depicted in FIG. 1, FIG. 2, FIG. 3 and FIG. 6, there is depicted a third aspect of the medical guidewire assembly 100.

Referring to the embodiment as depicted in FIG. 1, the apparatus (in accordance with the third aspect) includes and is not limited to (comprises) a medical guidewire assembly 100. The medical guidewire assembly 100 is, preferably, flexible. The medical guidewire assembly 100 includes an elongated section 102. The elongated section 102 is, preferably, flexible. A distal portion 104 extends from the elongated section 102. The distal portion 104 is, at least in part, installable and movable along an interior longitudinal channel 900 of the guidewire introducer 902 and through (at least in part) an exit portal 904 of the guidewire introducer 902. The guidewire introducer 902 is, preferably, flexible. The guidewire introducer 902, with the medical guidewire assembly 100 installed therein, is insertable, at least in part, (configured to be inserted) into a confined space defined by a patient 800.

Referring to the embodiment as depicted in FIG. 1, the apparatus (in accordance with the third aspect) also includes a piercing stylet assembly 106 that extends from the distal portion 104. The piercing stylet assembly 106 is configured to physically form (cut), at least in part, a puncture hole 802 (puncture site) through the tissue 804 (such as, the fossa ovalis of the heart) of the patient 800. This is done in response to movement (advancement), at least in part, of the distal portion 104 from (through) the exit portal 904 of the guidewire introducer 902, and the distal portion 104 and the piercing stylet assembly 106 move toward, and through, the tissue 804 of the patient 800 (once or after the guidewire introducer 902 and the medical guidewire assembly 100 have been inserted, at least in part, into the confined space defined by the patient 800). It will be appreciated that removal may include any relative movement between the medical guidewire assembly 100 and the guidewire introducer 902.

Referring to the embodiment as depicted in FIG. 2, the apparatus (in accordance with the third aspect) also includes a cutting assembly 108 that is spaced apart from the distal portion 104. The cutting assembly 108 is mounted to the elongated section 102. The cutting assembly 108 is configured to be removable from (advanced through) the exit portal 904 of the guidewire introducer 902 (once the medical guidewire assembly 100 is moved along the interior of the guidewire introducer 902).

Referring to the embodiments as depicted in FIG. 3 and FIG. 6 (in accordance with the third aspect), the cutting assembly 108 is further configured to cut (slice), at least in part, a portion of the tissue proximately surrounding (an inner diameter of the puncture hole 802, or the tissue positioned proximate to) the puncture hole 802 defined by the tissue 804. This is done in such a way that the cutting assembly 108 reduces, at least in part, the hoop stress 700 surrounding the puncture hole 802; this is done, preferably, once or after the puncture hole 802 is cut (sliced) by the cutting assembly 108, and/or in response to movement (advancement), at least in part, of the cutting assembly 108 through the exit portal 904 of the guidewire introducer 902 and then through the puncture hole 802; that is, after the puncture hole 802 is initially formed. A technical effect of the medical guidewire assembly 100 is that the medical guidewire assembly 100 reduces (at least in part) the hoop stress 700; this condition enables relatively easier crossing of the medical guidewire assembly 100 (and/or the guidewire introducer 902) through the puncture hole 802 (such as, across the inter-atrial septum of the heart of the patient 800) while the medical guidewire assembly 100 permits, at least in part, a reduced input force that may be required to initially form the puncture hole 802 (such as, the initial puncturing of the fossa ovalis of the patient 800).

Referring to the embodiments as depicted in FIG. 3 and FIG. 6 (in accordance with the third aspect), the cutting assembly 108 is further configured to reduce, at least in part, the hoop stress 700; this is done in response to the medical guidewire assembly 100 expanding (dilating) the puncture hole 802 while the medical guidewire assembly 100 is moved (is movable), at least in part, through the puncture hole 802.

Referring to the embodiments as depicted in FIG. 3 and FIG. 6 (in accordance with the third aspect), the cutting assembly 108 is further configured to cross entirely through the tissue 804 (such as the inter-atrial septum of the heart of the patient 800) as the cutting assembly 108 is advanced through puncture hole 802 (also called the puncture site).

Referring to the embodiments as depicted in FIG. 3 and FIG. 6 (in accordance with the third aspect), the cutting assembly 108 is (configured to be) mounted to an outer surface 110 of a body portion of the elongated section 102.

Referring to the embodiments as depicted in FIG. 3 and FIG. 6 (in accordance with the third aspect), the medical guidewire assembly 100 is configured to expand (dilate) the puncture hole 802. This is done in response to continued movement (advancement) of the distal portion 104 of the medical guidewire assembly 100 through the tissue 804 of the patient 800 (after a portion of the tissue that is positioned proximate to the puncture hole 802 has been cut, at least in part, by the cutting assembly 108).

Referring to the embodiments as depicted in FIG. 3 and FIG. 6 (in accordance with the third aspect), the cutting assembly 108 includes spaced-apart cutting sections (108A, 108B) positioned on the outer surface of the medical guidewire assembly 100 (such as, the elongated section 102, etc.).

Referring to the embodiments as depicted in FIG. 1, FIG. 3 and FIG. 6, there is depicted a method. The method is for reducing, at least in part, the hoop stress 700 surrounding a puncture hole 802 defined by the tissue 804 (such as, the fossa ovalis of the heart) of a patient 800.

Referring to the embodiment as depicted in FIG. 1, the method includes and is not limited to (comprises) operation (A). Operation (A) includes installing a medical guidewire assembly 100, at least in part, into the guidewire introducer 902. The medical guidewire assembly 100 includes a distal portion 104 extending from an elongated section 102 of the medical guidewire assembly 100. The medical guidewire assembly 100 also includes a piercing stylet assembly 106 extending from the distal portion 104. The medical guidewire assembly 100 also includes a cutting assembly 108 that is spaced apart from the distal portion 104. The cutting assembly 108 is mounted to the elongated section 102. The cutting assembly 108 is configured to be removable from the exit portal 904 of the guidewire introducer 902. The guidewire introducer 902 defines the exit portal 904 and also defines an interior longitudinal channel 900 that is in fluid communication with the exit portal 904.

Referring to the embodiment as depicted in FIG. 1, the method further includes operation (B). Operation (B) includes inserting the guidewire introducer 902 with (together with) the medical guidewire assembly 100, at least in part, into the confined space defined by the patient 800.

Referring to the embodiment as depicted in FIG. 1, the method further includes operation (C). Operation (C) includes moving, at least in part, the distal portion 104 of the medical guidewire assembly 100 along, at least in part, the interior longitudinal channel 900 of a guidewire introducer 902 so that distal portion 104 moves through the exit portal 904 of the guidewire introducer 902.

Referring to the embodiment as depicted in FIG. 2, the method further includes operation (D). Operation (D) includes removing, at least in part, the piercing stylet assembly 106 and the distal portion 104 from (through) the exit portal 904 of the guidewire introducer 902, so that the distal portion 104 and the piercing stylet assembly 106 move toward, and through, the tissue 804 (that is, once or after the exit portal 904 of the guidewire introducer 902 is positioned proximate to the tissue 804 of the patient 800). This is done in such a way that the piercing stylet assembly 106 initially physically forms (cuts), at least in part, a puncture hole 802 so that the puncture hole 802 extends through the tissue 804 of the patient 800.

Referring to the embodiments as depicted in FIG. 3 and FIG. 6, the method further includes operation (E). Operation (E) includes removing, at least in part, the cutting assembly 108 through the exit portal 904 of the guidewire introducer 902 and then through the puncture hole 802 defined by the tissue 804 of the patient 800 (after the puncture hole 802 has been initially formed, at least in part, by the piercing stylet assembly 106). This is done in such a way that (A) the cutting assembly 108, in use, cuts (slices), at least in part, a portion of the tissue proximately surrounding (an inner diameter of the puncture hole 802, or the tissue positioned proximate to) the puncture hole 802 defined by the tissue 804, and (B) the cutting assembly 108 reduces, at least in part, the hoop stress 700 surrounding the puncture hole 802.

Referring to the embodiment as depicted in FIG. 6, the medical guidewire assembly 100 is configured to reduce, at least in part, the hoop stress 700 surrounding the puncture hole 802 which extends through the tissue 804; this is done, preferably, in response to movement (advancement), at least in part, of the medical guidewire assembly 100 through, or relative to, the puncture hole 802 after the puncture hole 802 has been initially formed, as depicted in the embodiments of FIG. 2 and/or FIG. 4. Specifically, the hoop stress 700 surrounds (at least in part) an inner diameter of the puncture hole 802. Reduction of the hoop stress 700 enables relatively easier crossing of the medical guidewire assembly 100 and/or the guidewire introducer 902 through the puncture hole 802 while reducing and/or maintaining, at least in part, a reduced input force required to initially form the puncture hole 802. Preferably, the medical guidewire assembly 100 is also configured to form, at least in part, the puncture hole 802 which extends through the tissue 804 of the patient 800 (before the hoop stress 700 is reduced, at least in part, by the medical guidewire assembly 100 and in response to movement, at least in part, of the medical guidewire assembly 100 from the guidewire introducer 902). It will be appreciated that removal of the medical guidewire assembly 100 may include any relative movement between the medical guidewire assembly 100 and the guidewire introducer 902.

Figures 8, 9:
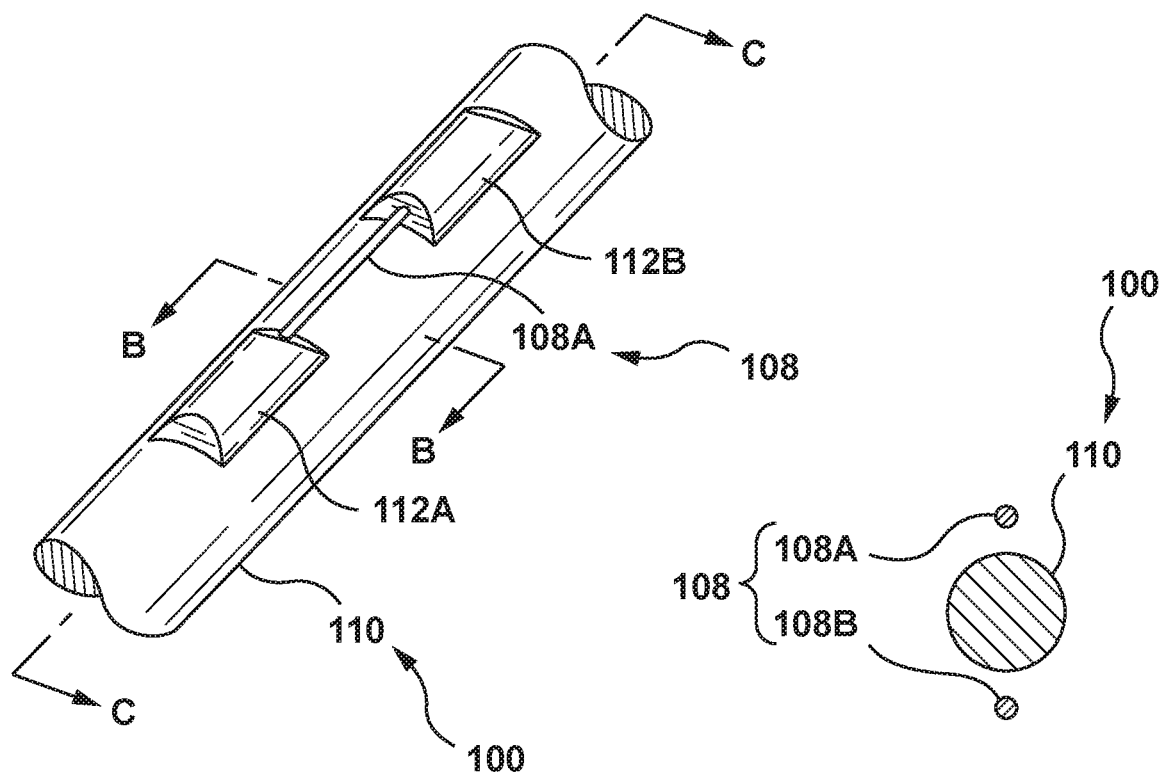
FIG. 8 depicts a perspective view of an embodiment of the medical guidewire assembly of FIG. 1.
FIG. 9 and FIG. 10 depict cross-sectional views of embodiments of the medical guidewire assembly of FIG. 8.

FIG. 8 depicts a perspective view of an embodiment of the medical guidewire assembly 100 of FIG. 1.

Figure 10:
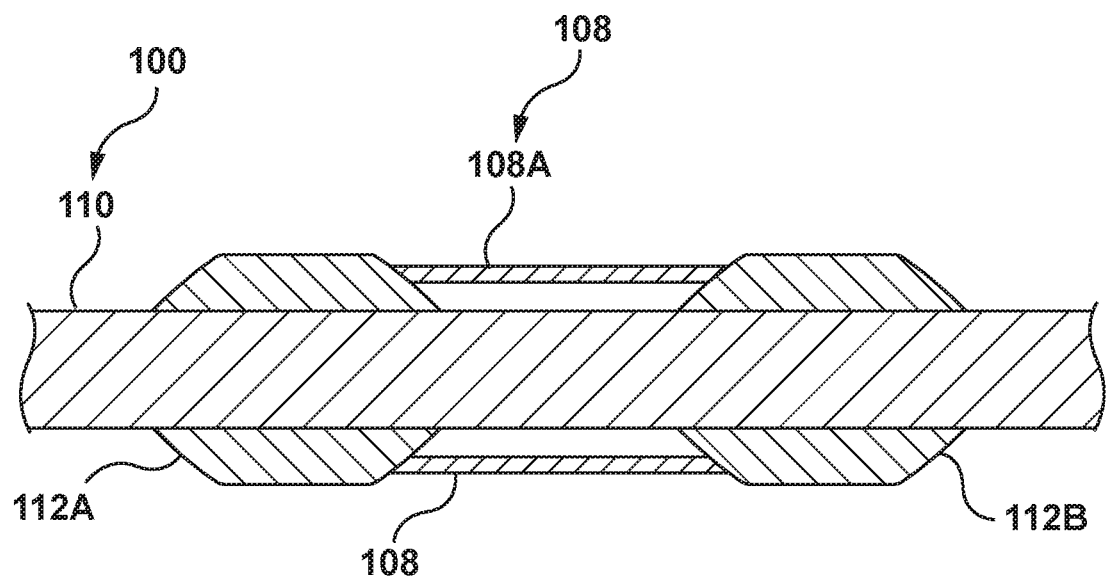

FIG. 9 and FIG. 10 depict cross-sectional views of embodiments of the medical guidewire assembly 100 of FIG. 8. The cross-sectional view of FIG. 9 is taken along a cross-sectional line A-A of FIG. 8. The cross-sectional view of FIG. 10 is taken along a cross-sectional line A-A of FIG. 8.

Referring to the embodiment as depicted in FIG. 8, the medical guidewire assembly 100 includes a cutting assembly 108 that is spaced apart from the piercing stylet assembly 106. The cutting assembly 108, preferably, includes spaced-apart cutting sections (108A, 108B) positioned (preferably) on opposite sides of the medical guidewire assembly 100. The spaced-apart cutting sections (108A, 108B) are spaced apart from the opposite sides of the medical guidewire assembly 100.

Referring to the embodiment as depicted in FIG. 8, the cutting assembly 108 includes spaced-apart cutting sections (108A, 108B). The spaced-apart cutting sections (108A, 108B) may include raised cutting wires positioned along (and spaced apart from) the outer surface of the medical guidewire assembly 100. The spaced-apart cutting sections (108A, 108B) may include relatively thin wires positioned parallel to, and raised from, the outer surface of the main body of the medical guidewire assembly 100. The spaced-apart cutting sections (108A, 108B) are configured to cut tissue and expand the size of the initially formed instance of the puncture hole 802 (in comparison to the size of the puncture hole 802 formed in FIG. 2) as the medical guidewire assembly 100 is advanced into the puncture hole 802. The cutting assembly 108 may include any type of cutting structure that expands the size of the initially formed instance of the puncture hole 802. The cutting assembly 108 may include, for instance, radiofrequency electrodes, blades, lasers, etc., and any equivalent thereof. The cutting assembly 108 may include any devices configured to further cut and expand the initially formed instance of the puncture hole 802. The cutting assembly 108 may include a balloon device (known and not depicted) configured to create (form) the puncture hole 802 in the tissue 804 and widen (dilate) the puncture hole 802. The balloon may be passed through the puncture hole 802 and then may be inflated to achieve this effect. The cutting assembly 108 may include an atherectomy device (known and not depicted) having a spinning burr positioned on the medical guidewire assembly 100. The spinning burr has an oval shape and acts to widen blood vessels that are occluded. The cutting assembly 108 is positioned along or near the piercing stylet assembly 106. The cutting assembly 108 has a size (outer dimension or outer diameter) that is larger than the size (outer dimension or outer diameter) of the piercing stylet assembly 106.

Referring to the embodiments as depicted in FIG. 9 and FIG. 10, the medical guidewire assembly 100 further includes a guard device 112 positioned proximate to the cutting assembly 108. Preferably, the guard device 112 is positioned at a leading edge of the cutting assembly 108. The guard device 112 forms a bulge that extends axially (outwardly) from the medical guidewire assembly 100. The guard device 112 is configured to further expand the puncture hole 802 as the medical guidewire assembly 100 is advanced (is passed through) the puncture hole 802. The guard device 112 includes, preferably, spaced-apart guards (112A, 112B) positioned at the end sections of the spaced-apart cutting sections (108A, 108B). The spaced-apart cutting sections (108A, 108B) may include raised cutting wires. The spaced-apart guards (112A, 112B) are configured to physically suspend the spaced-apart cutting sections (108A, 108B). The spaced-apart guards (112A, 112B) are also configured to prevent skiving of the interior longitudinal channel 900 of the guidewire introducer 902 as the medical guidewire assembly 100 is passed through the guidewire introducer 902. The spaced-apart guards (112A, 112B) are (preferably) ramp-shaped to enable smooth passage of the medical guidewire assembly 100 through the initially formed instance of the puncture hole 802. For the case where the cutting assembly 108, in use, cuts tissue via mechanical means, the guard device 112 may aid in the smooth crossing of the piercing stylet assembly 106 through the tissue 804. The guard device 112 may include a tissue-expansion section. The guard device 112 may be configured to permit blunt and atraumatic forces to the tissue 804 (if so desired). The guard device 112 may include raised sections configured to further dilate the puncture hole 802 rather than cut the side walls forming the puncture hole 802. The guard device 112 may be configured to dilate the puncture hole 802 so that the guidewire introducer 902 may be allowed to cross through the puncture hole 802 and achieve an outcome of relatively easier crossing of the guidewire introducer 902. The guard device 112 s configured to prevent contact of the cutting assembly 108 from making contact with the guidewire introducer 902 and mitigating any damage that might occur to the guidewire introducer 902. The guard device 112 (also called a puncture site expansion section) does not necessarily need to be on the main body of the medical guidewire assembly 100, and the guard device 112 may be placed in any appropriate position provided that the guard device 112 may function to expand the size of the initially formed instance of the puncture hole 802.

The following is offered as further description of the embodiments, in which any one or more of any technical feature (described in the detailed description, the summary and the claims) may be combinable with any other one or more of any technical feature (described in the detailed description, the summary and the claims). It is understood that each claim in the claims section is an open ended claim unless stated otherwise. Unless otherwise specified, relational terms used in these specifications should be construed to include certain tolerances that the person skilled in the art would recognize as providing equivalent functionality. By way of example, the term perpendicular is not necessarily limited to 90.0 degrees, and may include a variation thereof that the person skilled in the art would recognize as providing equivalent functionality for the purposes described for the relevant member or element. Terms such as "about" and "substantially", in the context of configuration, relate generally to disposition, location, or configuration that are either exact or sufficiently close to the location, disposition, or configuration of the relevant element to preserve operability of the element within the invention which does not materially modify the invention. Similarly, unless specifically made clear from its context, numerical values should be construed to include certain tolerances that the person skilled in the art would recognize as having negligible importance as they do not materially change the operability of the invention. It will be appreciated that the description and/or drawings identify and describe embodiments of the apparatus (either explicitly or inherently). The apparatus may include any suitable combination and/or permutation of the technical features as identified in the detailed description, as may be required and/or desired to suit a particular technical purpose and/or technical function. It will be appreciated that, where possible and suitable, any one or more of the technical features of the apparatus may be combined with any other one or more of the technical features of the apparatus (in any combination and/or permutation). It will be appreciated that persons skilled in the art would know that the technical features of each embodiment may be deployed (where possible) in other embodiments even if not expressly stated as such above. It will be appreciated that persons skilled in the art would know that other options would be possible for the configuration of the components of the apparatus to adjust to manufacturing requirements and still remain within the scope as described in at least one or more of the claims. This written description provides embodiments, including the best mode, and also enables the person skilled in the art to make and use the embodiments. The patentable scope may be defined by the claims. The written description and/or drawings may help to understand the scope of the claims. It is believed that all the crucial aspects of the disclosed subject matter have been provided in this document. It is understood, for this document, that the word "includes" is equivalent to the word "comprising" in that both words are used to signify an open-ended listing of assemblies, components, parts, etc. The term "comprising", which is synonymous with the terms "including," "containing," or "characterized by," is inclusive or open-ended and does not exclude additional, unrecited elements or method steps. Comprising (comprised of) is an "open" phrase and allows coverage of technologies that employ additional, unrecited elements. When used in a claim, the word "comprising" is the transitory verb (transitional term) that separates the preamble of the claim from the technical features of the invention. The foregoing has outlined the non-limiting embodiments (examples). The description is made for particular non-limiting embodiments (examples). It is understood that the non-limiting embodiments are merely illustrative as examples.

What is claimed is:

1. An apparatus, comprising:
a medical guidewire assembly being installable, at least in part, into, and movable, at least in part, along a guidewire introducer, and in which the guidewire introducer, with the medical guidewire assembly being installed, at least in part, therein, is configured for insertion, at least in part, into a biological wall of a patient; and
the medical guidewire assembly being configured to form, at least in part, a puncture hole through the tissue in response to movement, at least in part, of the medical guidewire assembly from the guidewire introducer after the guidewire introducer and the medical guidewire assembly have been inserted, at least in part, into the patient; and
the medical guidewire assembly being configured to cut, using a cutting assembly, a portion of the biological wall proximately surrounding the puncture hole, and increase, at least in part, circumference of the puncture hole in response to further movement, at least in part, of the medical guidewire assembly relative to the puncture hole;
wherein the cutting assembly comprises at least one raised cutting wire suspended by at least one guard.

2. The apparatus of claim 1, wherein:
the medical guidewire assembly is movable, at least in part, along an interior longitudinal channel of the guidewire introducer and through an exit portal of the guidewire introducer; and
the medical guidewire assembly includes:
a piercing stylet assembly being configured to form, at least in part, a puncture hole through the biological wall of the patient in response to movement, at least in part, of the piercing stylet assembly from the exit portal of the guidewire introducer after the guidewire introducer and the medical guidewire assembly have been inserted, at least in part, into a confined space of the patient.

3. The apparatus of claim 1, wherein:
the medical guidewire assembly further includes:
the cutting assembly is configured to cut, at least in part, a portion of the biological wall proximately surrounding the puncture hole in such a way that the cutting assembly increases, at least in part, the circumference of the puncture hole in response to movement, at least in part, of the medical guidewire assembly relative to the puncture hole.

4. An apparatus, comprising:
a medical guidewire assembly being installable, at least in part, into, and movable, at least in part, along a guidewire introducer, and in which the guidewire introducer, with the medical guidewire assembly being installed, at least in part, therein, is configured for insertion, at least in part, into a biological wall of a patient,
the medical guidewire assembly comprising:
an elongated section; and
a distal portion extending from the elongated section, and the distal portion being, at least in part, installable into and movable along an interior longitudinal channel of a guidewire introducer and through an exit portal of the guidewire introducer, and in which the guidewire introducer, with the medical guidewire assembly installed therein, is configured for insertion, at least in part, into a confined space defined by the biological wall of the patient; and
a piercing stylet assembly extending from the distal portion, and the piercing stylet assembly being configured to form, at least in part, a puncture hole through the biological wall of the patient in response to movement, at least in part, of the distal portion from the exit portal of the guidewire introducer, and the distal portion and the piercing stylet assembly move toward, and through, the biological wall of the patient after the guidewire introducer and the medical guidewire assembly have been inserted, at least in part, into the confined space defined by the biological wall of the patient; and
a cutting assembly being spaced apart from the distal portion, and being mounted on the elongated section, and the cutting assembly being configured to be removable from the exit portal of the guidewire introducer, and the cutting assembly being configured to cut, at least in part, a portion of the biological wall proximately surrounding the puncture hole defined by the biological wall in such a way that the cutting assembly increases, at least in part, circumference of the puncture hole in response to movement, at least in part, of the cutting assembly relative to the exit portal of the guidewire introducer and then through the puncture hole of the biological wall;
wherein, the cutting assembly includes a guard device positioned on at least a front leading portion of the cutting assembly.

5. The apparatus of claim 4, wherein:
the cutting assembly is configured to reduce, at least in part, the hoop stress in response to the medical guidewire assembly expanding the puncture hole while the medical guidewire assembly is moved, at least in part, through the puncture hole.

6. The apparatus of claim 4, wherein:
the cutting assembly is configured to cross entirely through the tissue as the cutting assembly is advanced through puncture hole.

7. The apparatus of claim 4, wherein:
the cutting assembly is mounted to an outer surface of a body portion of the elongated section.

8. The apparatus of claim 4, wherein:
the medical guidewire assembly is configured to expand the puncture hole in response to continued removal of the distal portion of the medical guidewire assembly through the biological wall of the patient after the tissue, which is positioned proximate to the puncture hole, was cut, at least in part, by the cutting assembly.

9. The apparatus of claim 4, wherein:
the cutting assembly includes spaced-apart cutting sections positioned on opposite sides of the medical guidewire assembly.

10. The apparatus of claim 9, wherein:
the spaced-apart cutting sections include raised cutting wires.

11. The apparatus of claim 4, wherein:
the guard device includes:
a first guard device; and
a second guard device being spaced apart from the first guard device.

12. The apparatus of claim 11, wherein:
the first guard device and the second guard device are respectively positioned at each respective end of the cutting assembly.

13. The apparatus of claim 4, wherein:
the medical guidewire assembly has an outer diameter that is about 0.032 inches.

14. The apparatus of claim 2, wherein:
the medical guidewire assembly has an outer diameter of about 0.032 inches.

15. The apparatus of claim 4, wherein:
the piercing stylet assembly is configured to mechanically puncture the biological wall under a desired or predetermined applied force applied to the piercing stylet assembly.

16. The apparatus of claim 4, wherein:
the piercing stylet assembly is configured to include a conductive radio frequency electrode to puncture the biological wall.

17. The apparatus of claim 4, wherein:
the cutting assembly includes spaced-apart cutting sections; and
the spaced-apart cutting sections include raised cutting wires positioned along, and spaced apart from, an outer surface of the medical guidewire assembly; and
the spaced-apart cutting sections are positioned parallel to, and raised from, the outer surface of the medical guidewire assembly; and
a guard device is positioned proximate to the cutting assembly; and
the guard device is positioned at a leading edge of the cutting assembly; and
the guard device forms a bulge that extends axially from the medical guidewire assembly; and
the guard device is configured to further expand the puncture hole as the medical guidewire assembly is advanced through the puncture hole; and
the guard device includes spaced-apart guards positioned at end sections of the spaced-apart cutting sections; and
the spaced-apart guards are configured to physically suspend the spaced-apart cutting sections; and
the spaced-apart guards are also configured to prevent skiving of the interior longitudinal channel of the guidewire introducer as the medical guidewire assembly is passed through the guidewire introducer; and
the spaced-apart guards are ramp-shaped to enable smooth passage of the medical guidewire assembly through the puncture hole after the puncture hole is initially formed.

18. The apparatus of claim 4, wherein:
the cutting assembly includes spaced-apart cutting sections; and
the spaced-apart cutting sections include radiofrequency electrode positioned along, and spaced apart from, an outer surface of the medical guidewire assembly; and
the spaced-apart cutting sections are positioned parallel to, and raised from, the outer surface of the medical guidewire assembly; and
a guard device is positioned proximate to the cutting assembly; and
the guard device is positioned at a leading edge of the cutting assembly; and
the guard device forms a bulge that extends axially from the medical guidewire assembly; and
the guard device is configured to further expand the puncture hole as the medical guidewire assembly is advanced through the puncture hole; and
the guard device includes spaced-apart guards positioned at end sections of the spaced-apart cutting sections; and
the spaced-apart guards are configured to physically suspend the spaced-apart cutting sections; and
the spaced-apart guards are also configured to prevent skiving of the interior longitudinal channel of the guidewire introducer as the medical guidewire assembly is passed through the guidewire introducer; and
the spaced-apart guards are ramp-shaped to enable smooth passage of the medical guidewire assembly through the puncture hole after the puncture hole is initially formed.

19. A method of reducing, at least in part, hoop stress surrounding a puncture hole defined by the tissue of a patient, the method comprising:
installing a medical guidewire assembly, at least in part, into a guidewire introducer, and in which the guidewire introducer with the medical guidewire assembly being installed at least in part, therein is insertable, at least in part, into a patient, and in which the medical guidewire assembly includes a distal portion extending from an elongated section of the medical guidewire assembly, and in which the medical guidewire assembly also includes a piercing stylet assembly extending from the distal portion, and in which the medical guidewire assembly also includes a cutting assembly that is spaced apart from the distal portion, and the cutting assembly is mounted to the elongated section and includes a guard device positioned on at least a front leading portion of the cutting assembly, and in which the cutting assembly is configured to be removable from an exit portal of the guidewire introducer; and in which the guidewire introducer defines the exit portal and an interior longitudinal channel in communication with the exit portal; and
inserting the guidewire introducer with the medical guidewire assembly, at least in part, into a confined space defined by the patient; and
moving, at least in part, the distal portion of the medical guidewire assembly along, at least in part, the interior longitudinal channel of a guidewire introducer and through the exit portal of the guidewire introducer; and removing, at least in part, the piercing stylet assembly and the distal portion through the exit portal of the guidewire introducer, and the distal portion and the piercing stylet assembly, in use, move toward, and through, the tissue of the patient after the exit portal of the guidewire introducer is positioned proximate to the tissue of the patient in such a way that the piercing stylet assembly, in use, initially physically forms, at least in part, a puncture hole so that the puncture hole extends through the tissue of the patient; and removing, at least in part, the cutting assembly through the exit portal of the guidewire introducer and then through the puncture hole defined by the tissue of the patient after the puncture hole has been initially formed, at least in part, by the piercing stylet assembly in such a way that the cutting assembly, in use, cuts, at least in part, a portion of the tissue proximately surrounding the puncture hole defined by the tissue, and the cutting assembly reduces, at least in part, the hoop stress surrounding the puncture hole.

\* \* \* \* \*